US012530450B2

(12) United States Patent
Blair et al.

(10) Patent No.: US 12,530,450 B2
(45) Date of Patent: Jan. 20, 2026

(54) SYSTEMS AND METHODS FOR AUTOMATICALLY TUNING ONE OR MORE API POLLERS IN A CYBERSECURITY EVENT DETECTION AND RESPONSE SERVICE

(71) Applicant: Expel, Inc., Herndon, VA (US)

(72) Inventors: Anders Blair, Culpeper, VA (US); Matthew Kracht, Washington, DC (US); Aaron Fermin, Clyde, NC (US); Sarah Taurchini, Falls Church, VA (US); Carter King, Chicago, IL (US); David Casagrande, Frederick, MD (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 19/059,945

(22) Filed: Feb. 21, 2025

(65) Prior Publication Data

US 2025/0291907 A1 Sep. 18, 2025

Related U.S. Application Data

(60) Provisional application No. 63/661,319, filed on Jun. 18, 2024, provisional application No. 63/565,202, filed on Mar. 14, 2024.

(51) Int. Cl.
*G06F 21/55* (2013.01)
(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,606,895 B1 * | 10/2009 | Dini | H04L 12/14 709/224 |
| 7,912,950 B1 * | 3/2011 | Saparoff | H04L 41/0233 709/224 |
| 11,271,866 B2 * | 3/2022 | Kludy | G06F 9/547 |
| 11,449,332 B2 * | 9/2022 | Ashirvad | G06F 9/3009 |
| 11,563,636 B1 * | 1/2023 | Kairali | H04L 67/563 |
| 11,582,327 B1 * | 2/2023 | Cifuentes de la Paz | H04L 67/34 |

(Continued)

*Primary Examiner* — Christopher C Harris
(74) *Attorney, Agent, or Firm* — Padowithz Alce; Chandler Scheitlin; Alce PLLC

(57) ABSTRACT

A method includes generating a polling task that is configured to retrieve raw event data of a subscriber that occurred during a target time span from a third-party security service, computing an optimal polling frequency control value for the polling task in response to generating the polling task, partitioning the target time span into a plurality of distinct sub-intervals of time based on the optimal polling frequency control value computed for the polling task, automatically transmitting, to an application programming interface endpoint of the third-party security service, a plurality of distinct network requests to optimally perform the polling task, receiving the raw event data of the subscriber from the third-party security service that occurred during the target time span in response to transmitting the plurality of distinct network request, and generating one or more security alerts in response to processing the raw event data.

18 Claims, 11 Drawing Sheets

(56) References Cited

U.S. PATENT DOCUMENTS

| | | | | |
|---|---|---|---|---|
| 12,182,151 | B1* | 12/2024 | Federschmidt | G06F 16/252 |
| 2003/0225883 | A1* | 12/2003 | Greaves | H04L 41/0856 |
| | | | | 709/224 |
| 2006/0282524 | A1* | 12/2006 | Lacombe | G06F 9/542 |
| | | | | 709/224 |
| 2009/0089784 | A1* | 4/2009 | Walters | G06F 9/485 |
| | | | | 718/102 |
| 2012/0078996 | A1* | 3/2012 | Shah | H04L 67/62 |
| | | | | 709/203 |
| 2012/0131095 | A1* | 5/2012 | Luna | H04L 69/28 |
| | | | | 709/224 |
| 2014/0047000 | A1* | 2/2014 | Zelek | H04L 41/0213 |
| | | | | 709/202 |
| 2015/0081906 | A1* | 3/2015 | Backholm | H04L 67/54 |
| | | | | 709/225 |
| 2016/0191659 | A1* | 6/2016 | Farrell | H04L 69/04 |
| | | | | 709/219 |
| 2017/0085456 | A1* | 3/2017 | Whitner | H04L 43/103 |
| 2017/0279719 | A1* | 9/2017 | Faith | H04L 67/1008 |
| 2020/0112500 | A1* | 4/2020 | Wang | H04L 43/0817 |
| 2020/0142746 | A1* | 5/2020 | Gong | G06F 9/4881 |
| 2021/0097012 | A1* | 4/2021 | Cai | G06F 9/546 |
| 2023/0036615 | A1* | 2/2023 | Chen | G06F 3/061 |
| 2023/0251984 | A1* | 8/2023 | Gallagher | G06F 13/22 |
| | | | | 710/109 |
| 2024/0211306 | A1* | 6/2024 | Saha | H04W 72/0453 |
| 2024/0345743 | A1* | 10/2024 | Mulani | G06F 3/0625 |
| 2025/0141738 | A1* | 5/2025 | Gupta | H04L 43/16 |

\* cited by examiner

IDENTIFYING AN API-BASED POLLING TASK S210

COMMENCING AN API POLLING OPTIMIZATION ALGORITHM FOR THE API-BASED POLLING TASK S220

EXECUTING THE API-BASED POLLING TASK BASED ON THE OPTIMAL POLLING STEP VALUE COMPUTED BY THE API POLLING OPTIMIZATION ALGORITHM S230

GENERATING AN API POLLING INTELLIGENCE INTERFACE S240

FIGURE 2

SYSTEMS AND METHODS FOR AUTOMATICALLY TUNING ONE OR MORE API POLLERS IN A CYBERSECURITY EVENT DETECTION AND RESPONSE SERVICE

CROSS-REFERENCE TO RELATED APPLICATIONS

This application claims the benefit of U.S. Provisional Application No. 63/661,319, filed 18 Jun. 2024 and U.S. Provisional Application No. 63/565,202, filed 14 Mar. 2024, which are incorporated in their entireties by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slow down the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. The embodiments of the present application described herein provide technical solutions that address, at least the need described above.

BRIEF SUMMARY OF THE EMBODIMENTS

In one embodiment, a computer-implemented method includes at a cybersecurity event detection and response service that is implemented by a network of distributed computers: generating, via one or more computers, a polling task that is configured to retrieve raw event data of a target subscriber that occurred during a target time span from a third-party security service; computing, via the one or more computers, an optimal polling frequency control value for the polling task in real-time in response to generating the polling task, wherein computing the optimal polling frequency control value for the polling task includes: automatically sourcing, from a computer database, polling performance data for a predetermined number of historical polling steps executed by the cybersecurity event detection and response service, wherein each historical polling step of the predetermined number of historical polling steps retrieved a distinct set of historical raw event data of the target subscriber from the third-party security service for a distinct time interval, automatically computing a memory-informed candidate polling frequency control value and a time-informed candidate polling frequency control value using the polling performance data sourced from the computer database, and automatically electing one of the memory-informed candidate polling frequency control value and the time-informed candidate polling frequency control value as the optimal polling frequency control value in response to assessing the memory-informed candidate polling frequency control value against the time-informed candidate polling frequency control value; partitioning, via the one or more computers, the target time span into a plurality of distinct sub-intervals of time based on the optimal polling frequency control value computed for the polling task; automatically transmitting, to an application programming interface endpoint of the third-party security service, a plurality of distinct network requests to optimally perform the polling task, wherein each distinct network request corresponds to (i) a distinct sub-interval of time of the plurality of distinct sub-intervals of time and (ii) is configured to retrieve a respective portion of the raw event data that corresponds to the distinct sub-interval of time of the plurality of distinct sub-intervals of time; receiving the raw event data of the target subscriber from the third-party security service that occurred during the target time span in response to transmitting the plurality of distinct network requests; and generating, in real-time, one or more security alerts based on the cybersecurity event detection and response service processing the raw event data received from the third-party security service.

In one embodiment, the computer-implemented method further includes before computing the optimal polling frequency control value for the polling task sourcing, from the computer database, a respective optimal polling frequency control value used for a predetermined number of historical polling runs associated with the polling task; assessing, via the one or more computers, whether the respective optimal polling frequency control value has been a same optimal polling frequency control value over the predetermined number of historical polling runs; and bypassing computing the optimal polling frequency control value for the polling task when the respective optimal polling frequency control value has not been the same optimal polling frequency control value over the predetermined number of historical polling runs.

In one embodiment, the assessment indicates the respective optimal polling frequency control value has been the same optimal polling frequency control value over the predetermined number of historical polling runs, and the optimal polling frequency control value is computed for the polling task in response to the assessment indicating the respective optimal polling frequency control value has been the same optimal polling frequency control value over the predetermined number of historical polling runs.

In one embodiment, the polling performance data for the predetermined number of historical polling steps includes a first amount of memory that was used during a first historical polling step of the predetermined number of historical polling steps, a second amount of memory that was used during a second historical polling step of the predetermined number of historical polling steps, a third amount of memory that was used during a third historical polling step of the predetermined number of historical polling steps, a fourth amount of memory that was used during a fourth historical polling step of the predetermined number of historical polling steps, and a fifth amount of memory that was used during a fifth historical polling step of the predetermined number of historical polling steps.

In one embodiment, the polling performance data for the predetermined number of historical polling steps further includes a first polling step length value measured in time that corresponds to the first historical polling step, a second polling step length value measured in time that corresponds to the second historical polling step, a third polling step length value measured in time that corresponds to the third historical polling step, a fourth polling step length value measured in time that corresponds to the fourth historical polling step, and a fifth polling step length value measured in time that corresponds to the fifth historical polling step.

In one embodiment, the computer-implemented method further includes computing, via the one or more computers, a first average memory per second value that corresponds to the first historical polling step by dividing the first amount of memory that was used during the first historical polling step by the first polling step length value; computing, via the one or more computers, a second average memory per second value that corresponds to the second historical polling step by dividing the second amount of memory that was used during the second historical polling step by the second polling step length value; computing, via the one or more computers, a third average memory per second value that corresponds to the third historical polling step by dividing the third amount of memory that was used during the third historical polling step by the third polling step length value; computing, via the one or more computers, a fourth average memory per second value that corresponds to the fourth historical polling step by dividing the fourth amount of memory that was used during the fourth historical polling step by the fourth polling step length value; and computing, via the one or more computers, a fifth average memory per second value that corresponds to the fifth historical polling step by dividing the fifth amount of memory that was used during the fifth historical polling step by the fifth polling step length value.

In one embodiment, automatically computing the memory-informed candidate polling frequency control value includes determining, via the one or more computers, a maximum memory usage per step length second value based on determining a maximum of the first average memory per second value, the second average memory per second value, the third average memory per second value, the fourth average memory per second value, and the fifth average memory per second value, and computing the memory-informed candidate polling frequency control value by dividing a predetermined maximum memory limit defined via the cybersecurity event detection and response service by the maximum memory usage per step length second value.

In one embodiment, the polling performance data for the predetermined number of historical polling steps further includes a first polling step execution time value that corresponds to a total time duration required to complete the first historical polling step, a second polling step execution time value that corresponds to the total time duration required to complete the second historical polling step, a third polling step execution time value that corresponds to the total time duration required to complete the third historical polling step, a fourth polling step execution time value that corresponds to the total time duration required to complete the fourth historical polling step, and a fifth polling step execution time value that corresponds to the total time duration required to complete the fifth historical polling step.

In one embodiment, the polling performance data for the predetermined number of historical polling steps further includes a first polling step length value measured in time that corresponds to the first historical polling step, a second polling step length value measured in time that corresponds to the second historical polling step, a third polling step length value measured in time that corresponds to the third historical polling step, a fourth polling step length value measured in time that corresponds to the fourth historical polling step, and a fifth polling step length value measured in time that corresponds to the fifth historical polling step.

In one embodiment, the computer-implemented method further includes computing, via the one or more computers, a first execution time seconds per step length second value that corresponds to the first historical polling step by dividing the first polling step execution time value of the first historical polling step by the first polling step length value of the first historical polling step, computing, via the one or more computers, a second execution time seconds per step length second value that corresponds to the second historical polling step by dividing the second polling step execution time value of the second historical polling step by the second polling step length value of the second historical polling step, computing, via the one or more computers, a third execution time seconds per step length second value that corresponds to the third historical polling step by dividing the third polling step execution time value of the third historical polling step by the third polling step length value of the third historical polling step, computing, via the one or more computers, a fourth execution time seconds per step length second value that corresponds to the fourth historical polling step by dividing the fourth polling step execution time value of the fourth historical polling step by the fourth polling step length value of the fourth historical polling step, and computing, via the one or more computers, a fifth execution time seconds per step length second value that corresponds to the fifth historical polling step by dividing the fifth polling step execution time value of the fifth historical polling step by the fifth polling step length value of the fifth historical polling step.

In one embodiment, automatically computing the time-informed candidate polling frequency control value includes determining, via the one or more computers, a median execution time seconds per step length second value based on determining a median of the first execution time seconds per step length second value, the second execution time seconds per step length second value, the third execution time seconds per step length second value, the fourth execution time seconds per step length second value, and the fifth execution time seconds per step length second value, and computing the time-informed candidate polling frequency control value by dividing a predetermined maximum polling step processing time limit defined via the cybersecurity event detection and response service by the median execution time seconds per step length second value.

In one embodiment, partitioning the target time span into the plurality of distinct sub-intervals of time includes partitioning the target time span into a first sub-interval of time that corresponds a first distinct portion of the target time span, partitioning the target time span into a second sub-interval of time that corresponds a second distinct portion of the target time span, wherein the second sub-interval of time does not overlap with the first sub-interval of time, and partitioning the target time span into a third sub-interval of time that corresponds a third distinct portion of the target time span, wherein the third sub-interval of time does not overlap with the first sub-interval of time nor the second sub-interval of time.

In one embodiment, the computer-implemented method further includes automatically creating, via the one or more computers, a first distinct network request that is configured to retrieve the respective portion of the raw event data of the target subscriber that corresponds to the first distinct portion of the target time span; automatically creating, via the one or more computers, a second distinct network request that is configured to retrieve the respective portion of the raw event data of the target subscriber that corresponds to the second distinct portion of the target time span; and automatically creating, via the one or more computers, a third distinct network request that is configured to retrieve the respective portion of the raw event data of the target subscriber that corresponds to the third distinct portion of the target time span.

In one embodiment, automatically transmitting the plurality of distinct network requests to the application programming interface endpoint of the third-party security service includes electronically transmitting, over a computer network, the first distinct network request to the application programming interface endpoint of the third-party security service to retrieve the respective portion of the raw event data of the target subscriber that corresponds to the first distinct portion of the target time span, electronically transmitting, over the computer network, the second distinct network request to the application programming interface endpoint of the third-party security service to retrieve the respective portion of the raw event data of the target subscriber that corresponds to the second distinct portion of the target time span, and electronically transmitting, over the computer network, the third distinct network request to the application programming interface endpoint of the third-party security service to retrieve the respective portion of the raw event data of the target subscriber that corresponds to the third distinct portion of the target time span.

In one embodiment, receiving the raw event data of the target subscriber from the third-party security service that occurred during the target time span includes receiving, from the third-party security service, the respective portion of the raw event data of the target subscriber that corresponds to the first distinct portion of the target time span in response to transmitting the first distinct network request to the application programming interface endpoint of the third-party security service, receiving, from the third-party security service, the respective portion of the raw event data of the target subscriber that corresponds to the second distinct portion of the target time span in response to transmitting the second distinct network request to the application programming interface endpoint of the third-party security service, and receiving, from the third-party security service, the respective portion of the raw event data of the target subscriber that corresponds to the third distinct portion of the target time span in response to transmitting the third distinct network request to the application programming interface endpoint of the third-party security service.

In one embodiment, the computer-implemented method the one of the memory-informed candidate polling frequency control value and the time-informed candidate polling frequency control value is greater than a static, predefined polling frequency control value defined for the third-party security service, thereby (i) reducing a total number of network requests that the cybersecurity event detection and response service transmits to the application programming interface endpoint to obtain the raw event data and (ii) reducing a likelihood of the polling task encountering an application programming interface request error due to exceeding a predetermined maximum application programming interface rate limit defined by the third-party security service.

In one embodiment, the one of the memory-informed candidate polling frequency control value and the time-informed candidate polling frequency control value is smaller than a static, predefined polling frequency control value defined for the third-party security service, thereby (i) accelerating the receiving of the raw event data by the cybersecurity event detection and response service, (ii) the generation of the one or more security alerts, and (iii) a detection of a security threat associated with one or more security alerts.

In one embodiment, the computer-implemented method further includes executing, in real-time, a threat mitigation response that mitigates a security threat corresponding to the one or more security alerts by: (i) surfacing the security threat and the one or more security alerts in real-time to a threat reporting user interface accessible to the target subscriber, (ii) generating one or more proposed threat remediation actions for the one or more security alerts in real-time that, when implemented, mitigates the security threat corresponding to the one or more security alerts, and (iii) surfacing the one or more proposed threat remediation actions in real-time to the threat reporting user interface accessible to the target subscriber.

In one embodiment, the one or more security alerts includes a compromised digital asset of the target subscriber, the computer-implemented method further comprising executing, in real-time, a threat mitigation response that mitigates a security threat corresponding to the compromised digital asset by automatically executing, in real-time, one or more automated threat remediation actions that adapts, in real-time, a configuration characteristic or operating characteristic of one or more digital environments of the target subscriber to resolve the security threat associated with the compromised digital asset.

In one embodiment, the computer-implemented method further includes during or after the execution of the historical polling steps sourced from the computer database determining, for each historical polling step, an amount of computational time and compute resources used to perform a respective historical polling step of the historical polling steps using a processor of the one or computers that tracks a start time of the respective historical polling step, an end time of the respective historical polling step, and how much memory has been allocated to the respective historical polling step between the start time and the end time of the respective historical polling step.

In one embodiment, the computer-implemented method further includes while the one or more computers are performing the polling task or after the one or more computers perform the polling task: determining, for each polling step of the polling task, an amount of computational time and compute resources used to perform a respective historical polling step using a computer processor of the one or computers that tracks a start time of the respective historical polling step, an end time of the respective historical polling step, and how much memory has been allocated to the respective historical polling step between the start time and the end time of the respective historical polling step.

In one embodiment, the computer-implemented method further includes while the one or more computers are performing the polling task or after the one or more computers perform the polling task determining, for the polling task, an amount of computational time and compute resources used to perform the polling task using a computer processor of the one or computers that tracks a start time of the polling task, an end time of the polling task, and how much memory has been allocated to the polling task between the start time and the end time of the polling task.

In one embodiment, the memory-informed candidate polling frequency control value is elected as the optimal polling frequency control value, the one or more computers performing the polling task uses less computer memory to retrieve and process the raw event data of the target subscriber by using the memory-informed candidate polling frequency control value over a static, predefined polling frequency control value defined for the third-party security service, and the memory-informed candidate polling frequency control value is different than the static, predefined polling frequency control value.

In one embodiment, the one or more computers performing the polling task completes the polling task faster by using the one of the memory-informed candidate polling frequency control value and the time-informed candidate polling frequency control value over a static, predefined polling frequency control value defined for the third-party security service, thereby accelerating the generation of the one or more security alerts and a detection of a security threat associated with one or more security alerts.

BRIEF DESCRIPTION OF THE FIGURES

FIG. 2 illustrates an example method 200 in accordance with one or more embodiments of the present application;

DESCRIPTION OF THE PREFERRED EMBODIMENTS

Figure 1:
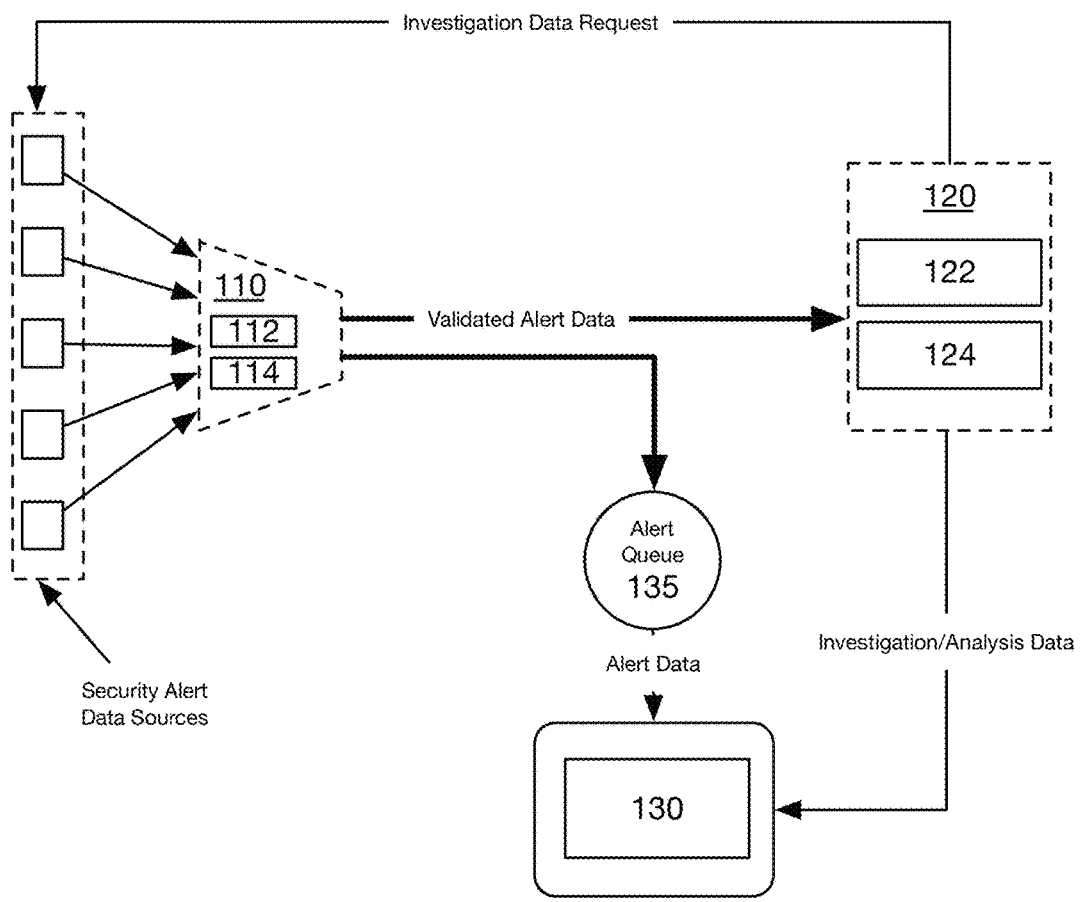
FIG. 1 illustrates a schematic representation of a system 100 in accordance with one or more embodiments of the present application.

The following description of the preferred embodiments of the inventions are not intended to limit the inventions to these preferred embodiments, but rather to enable any person skilled in the art to make and use these inventions.

The systems, methods, and computer program products described herein may be utilized in a variety of systems and services where improving poller efficiency and optimizing the execution of polling tasks is critical. This includes cybersecurity services where detecting and/or mitigating suspicious digital activity is essential for maintaining the integrity and security of digital assets of subscribers. It shall be noted that polling, as generally referred to herein, may be a computer-based process in which one or more servers, computers, or processing devices (e.g., repeatedly) queries a third-party data source, third-party application, third-party service, or third-party security device to collect new data (e.g., new raw event data).

As described in more detail herein, the systems, methods, and computer program products, in one or more embodiments, may execute a set of computer-executable instructions that computes an optimal polling frequency control value for a respective polling task before a poller (e.g., a computer, a server, or the like) executes the respective polling task. The computed optimal polling frequency control value (e.g., optimal polling step value, champion polling step value, or the like) for the respective polling task may be dynamically determined based on historical polling performance data, memory usage data, processing time data, and/or operational limits of the respective API endpoint from which the respective polling task is configured to retrieve data. Using such systems, methods, and computer-program products provides many technical benefits and advantages.

For instance, such systems, methods, and computer-program products, in one or more embodiments, may accelerate the ingestion of raw event data from a respective third-party security service by automatically computing an optimal polling frequency control value (e.g., optimal polling step value or the like) and performing the dynamic partitioning of a target time span into multiple sub-intervals based on the computed optimal polling frequency control value. In a non-limiting example, a computer, server, or any other suitable processing device (e.g., a poller or the like) may be configured or scheduled to execute a polling task that may be configured to retrieve raw event data of a single subscriber from a third-party security service over a target time span (e.g., 12:00 PM-3:00 PM). Accordingly, in such a non-limiting example, instead of transmitting a single network request (e.g., API call or the like) for the entire time span (e.g. 12:00 PM-3:00 PM), the computer, server, or the poller commencing an execution or an initiation of the polling task may execute a set of computer-executable instructions to dynamically compute an optimal polling step value for the polling task in real-time. In such a non-limiting example, if the computed optimal polling step value is one hour, the computer, the server, or the poller may automatically partition the target time span into three distinct sub-intervals of time: 12:00 PM-1:00 PM, 1:00 PM-2:00 PM, and 2:00 PM-3:00 PM.

Furthermore, in one or more embodiments, to execute (e.g., perform) the polling task, the computer, server, or poller may automatically generate a first distinct network request to retrieve raw event data from the third-party security service for the single subscriber that occurred between 12:00 PM and 1:00 PM (e.g., initial sub-interval of time), a second distinct network request to retrieve raw event data from the third-party security service for the single subscriber that occurred between 1:00 PM and 2:00 PM (e.g., subsequent sub-interval of time), and a third distinct network request to retrieve raw event data from the third-party security service for the single subscriber that occurred between 2:00 PM and 3:00 PM (e.g., final sub-interval of time). Additionally, in such a non-limiting example, in response to generating the first distinct network request, the second distinct network request, and the third distinct network request, the computer, server, or poller may electronically (e.g., sequentially) transmit, over a computer network, the first distinct network request, the second distinct network request, and the third distinct network request to an application programming interface (API) endpoint of the third-party security service. In one or more embodiments, after electronically transmitting each distinct network request, the computer, server, or poller may electronically receive a corresponding response from the API endpoint containing raw event data for the respective sub-interval of time (e.g., a first distinct response that includes the raw event data that occurred between 12:00 PM and 1:00 PM, a second distinct response that includes the raw event data that occurred between 1:00 PM and 2:00 PM, and a third distinct response that includes the raw event data that occurred between 2:00 PM and 3:00 PM.

At least one technical advantage of performing the polling task over multiple distinct network requests instead of a single, large network request may reduce the time needed for the cybersecurity event detection and response service to ingest and begin processing raw event data. By enabling the cybersecurity event detection and response service to process smaller raw event data chunks in real time or near real-time, the cybersecurity event detection and response service may reduce API response latency, minimize memory consumption, and allow for immediate threat detection and analysis as each sub-interval of data is received, rather than waiting for the retrieval of an entire raw event dataset (1.5 gigabyte dataset, etc.) before data processing begins.

Additionally, in some of the systems, methods, and computer-program products described herein, the systems, methods, and computer-program products may implement one or more computers (e.g., a processor, a processing device or the like) to track polling performance data for each polling task, polling run, and/or polling step executed by the cybersecurity event detection and response service. The polling performance data may include, but should not be limited to, API response times, data retrieval latency, memory consumption, central processing unit (CPU) utilization, network bandwidth usage, error rates, and a total time taken to complete each polling task, polling run, and/or polling step. Such polling performance data may be used during a computation of an optimal polling frequency control value (e.g., optimal polling step value or the like) for a target polling task (e.g., API polling task) and, in turn, use the computed optimal polling frequency control value when performing the target polling task, as described in more detail herein.

It shall be recognized that the optimal polling frequency control value may vary from subscriber to subscriber and across different third-party services, even when the polling window (e.g., query window) remains the same. While the query window may define a fixed time range for data retrieval (e.g., 12:00 PM-3:00 PM), the optimal polling step value (e.g., optimal polling frequency control value) may differ based on a variety of factors such as the volume of security events, API rate limits, and system resource constraints. For example, a system or service implementing method 200 may compute a shorter polling step value (e.g., 30 minutes) for a polling task that queries raw event data from a third-party security service (e.g., third-party security device) for a subscriber with a high frequency of security events (e.g., exceeding a threshold value), whereas the system or service implementing method 200 may compute a longer polling step value (e.g., one hour) for a polling task that queries raw event data from the same third-party security service (e.g., third-party security device) for a different subscriber with a lower frequency of security events (e.g., not exceeding the threshold value).

At least one technical advantage of automatically computing the optimal polling frequency control value for each polling task may enable a reduction in a total number of network requests (e.g., API requests) required to perform a respective polling task. For instance, in a non-limiting example, a poller (e.g., a computer or the like) executing a polling task to obtain raw event data from a third-party security service (e.g., third-party security device) may initially use a default polling step value of 30 minutes, but the cybersecurity event detection and response service may compute a plurality of candidate polling step values greater than the default polling step value (e.g., 45 minutes, one hour, or 90 minutes) based on historical polling performance data associated with the polling task and, in turn, implement one of the plurality of candidate polling step values, thereby reducing the total number of API requests required to perform the polling task while still satisfying one or more predetermined API polling thresholds defined by the cybersecurity event detection and response service.

Another technical advantage of automatically computing the optimal polling frequency control value for each polling task may enable optimized memory (e.g., random access memory, etc.) utilization by dynamically adjusting the polling step value to balance data ingestion with compute resource constraints of the cybersecurity event detection and response service. For instance, in a non-limiting example, a poller (e.g., a computer, a server, etc.) executing a polling task to obtain raw event data from a third-party security service (e.g., third-party security device) may initially use a default polling step value of 10 minutes. However, in such a non-limiting example, if historical polling performance data associated with the polling task indicates excessive memory consumption (e.g., exceeding a predefined memory threshold (e.g., 1.0 GB or the like), the cybersecurity event detection and response service may compute a plurality of candidate polling step values (e.g., 5 minutes, 3 minutes, etc.) that may reduce memory load and, in turn, implement one of the plurality of candidate polling step values to distribute memory usage more across smaller polling steps, thereby preventing compute resource exhaustion while maintaining timely data retrieval. In other words, by dynamically computing, selecting, and implementing an optimized polling step value for the polling task, the system or service implementing method 200 may ensure that each polling run and/or polling step associated with the polling task may retrieve smaller data chunks per request, thereby smoothing memory usage, mitigating memory spikes, and preventing overutilization of compute resources, while still maintaining efficient, uninterrupted, and responsive security event monitoring.

Another technical advantage of dynamically computing and adjusting the optimal polling frequency control value for each polling task may include provisioning and using fewer compute resources to perform a respective polling task, as the cybersecurity event detection and response service may optimize the allocation of processing power (e.g., CPUs) and memory based on historical polling performance data. By dynamically adjusting the polling step value, the cybersecurity event detection and response service may avoid allocating excess compute resources to accommodate peak memory and data processing demands, thereby reducing the likelihood of underutilized compute resources and improving overall data processing efficiency. For instance, in a non-limiting example, a poller (e.g., a computer, a server, etc.) executing a polling task to obtain raw event data from a third-party security service (e.g., third-party security device) may be consuming over 1.5 gigabytes of memory per polling step using a default polling step value (e.g., 10 minutes), but after the cybersecurity event detection and response service computes and implements an optimal polling step value (e.g., three minutes), each polling step associated with the polling task may require less memory (e.g., instead of provisioning 1.5 gigabytes of memory, the system or service implementing method 200 may only need to provision 500 megabytes of memory per polling step), thereby reducing the total amount of compute resources needed to perform the polling task.

Another technical advantage of dynamically computing and adjusting the optimal polling frequency control value for each polling task may include increasing polling efficiency by reducing a total time required to complete each polling step of a respective polling task, thereby accelerating data retrieval and ingestion. For instance, in a non-limiting example, a poller (e.g., a computer, a server, or the like) executing a polling task to obtain raw event data from a third-party security service may initially use a default polling step value (e.g., one hour), resulting in each polling step taking approximately 20 minutes to complete. However, after the cybersecurity event detection and response service computes and implements an optimal polling step value using the systems, methods, and computer program products described herein, the duration or total time of each polling step of the polling task, in such a non-limiting example, may be reduced to approximately five minutes, enabling the cybersecurity event detection and response service to retrieve the raw event data, process the raw event data, and generate security alerts based on the raw event data at least four times faster, thereby significantly improving data processing speed, enhancing system responsiveness, and ensuring more timely security event detection and response.

1. System for Remote Cyber Security Operations & Automated Investigations

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system or a cybersecurity event detection and response service. The cybersecurity event detection and response service, in one or more embodiments, may be implemented by a network of distributed computers.

The system 100 may function to enable real-time cybersecurity threat detection, agile, and intelligent threat response for mitigating detected security threats. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

It shall be recognized that, in some embodiments, the security alert engine or any other suitable module of system 100 may periodically poll the plurality of distinct sources of cyber security alert data and/or the native APIs associated with a respective subscriber at predefined intervals to enable the continuous retrieval and assessment of raw event data in real-time and, in turn, generate one or more security alerts in real-time based on the assessment. In other words, a computer, a server, a processing device performing a polling task may retrieve raw event data directly from one or more integrated security data sources (e.g., third-party security devices, third-party security services, third-party applications, or the like) at scheduled intervals to ensure a consistent flow of up-to-date security events and/or raw event data. This may allow the system 100 to ingest, process, normalize, and/or analyze newly obtained raw event data as soon as it is collected, thereby facilitating accurate and timely threat detection and response.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by one or more computing servers, computer processors, and the like of the system 100. It shall be recognized that the phrase "computing server" may be interchangeably referred to herein as a "server" and the phrase "computer processor" may be interchangeably referred to herein as a "processor."

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security alerts, security threats, and/or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Automatically Tuning or Optimizing One or More API Pollers in a Cybersecurity Event Detection and Response Service As shown in FIG. 2, a method 200 for automatically tuning or optimizing a subject API poller in a cybersecurity event detection and response service may include identifying an API-based polling task S210, commencing an API polling optimization algorithm for the API-based polling task S220, executing the API-based polling task based on the optimal polling step value computed by the API polling optimization algorithm S230, and generating an API polling intelligence interface S240.

In other words, in one or more embodiments, a system or service implementing method 200 may function to automatically tune or automatically optimize, in real-time or near real-time, one or more API pollers of the cybersecurity event detection and response service to accelerate the retrieval of raw event data, the processing of the retrieved raw event data, and the generation of security alerts based on the retrieved raw event data, while minimizing memory consumption, reducing application programming interface (API) response latency, as described in more detail herein.

2.10 Identifying an API-Based Polling Task

S210, which includes identifying an application programming interface (API) polling task, may function to identify one or more API-based polling tasks scheduled for execution by a polling task scheduler or any other suitable scheduling mechanism. In one or more embodiments, an API-based polling task, when executed, may function to initiate one or more network requests to retrieve data from a target server, API endpoint, or the like. It shall be recognized that the phrase "API-based polling task" may be interchangeably referred to herein as a "API polling task", a "polling task", a "data retrieval task", a "data fetching operation", or the like.

In one or more embodiments, a system or service implementing method 200 may be configured to have data integrations with a large number of security and/or business applications. In such embodiments, due to the large number of data integrations, the system or service implementing method 200 may execute hundreds, if not thousands, of API-based polling tasks at any given moment to continuously fetch the data (e.g., raw event data) needed for the system or service to efficiently detect and respond to cybersecurity events, in real-time or near real-time. It shall be recognized that the system or service implementing method 200 may identify, investigate, and/or respond to security events/alerts as described in U.S. patent application Ser. No. 17/488,800, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, U.S. patent application Ser. No. 17/501,708, titled SYSTEMS AND METHODS FOR INTELLIGENT PHISHING THREAT DETECTION AND PHISHING THREAT REMEDIATION IN A CYBER SECURITY THREAT DETECTION AND MITIGATION PLATFORM, U.S. patent application Ser. No. 17/671,881, titled SYSTEMS AND METHODS FOR INTELLIGENT CYBER SECURITY THREAT DETECTION AND INTELLIGENT VERIFICATION-INFORMED HANDLING OF CYBER SECURITY EVENTS THROUGH AUTOMATED VERIFICATION WORKFLOWS, U.S. patent application Ser. No. 17/850,328, titled SYSTEMS AND METHODS FOR INTELLIGENT CYBERSECURITY ALERT SIMILARITY DETECTION AND CYBERSECURITY ALERT HANDLING, U.S. patent application Ser. No. 18/123,137, titled SYSTEMS AND METHODS FOR ACCELERATED REMEDIATIONS OF CYBERSECURITY ALERTS AND CYBERSECURITY EVENTS IN A CYBERSECURITY EVENT DETECTION AND RESPONSE PLATFORM, and U.S. patent application Ser. No. 18/129,638, titled SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM, which are incorporated herein in their entireties by this reference.

Figure 4:
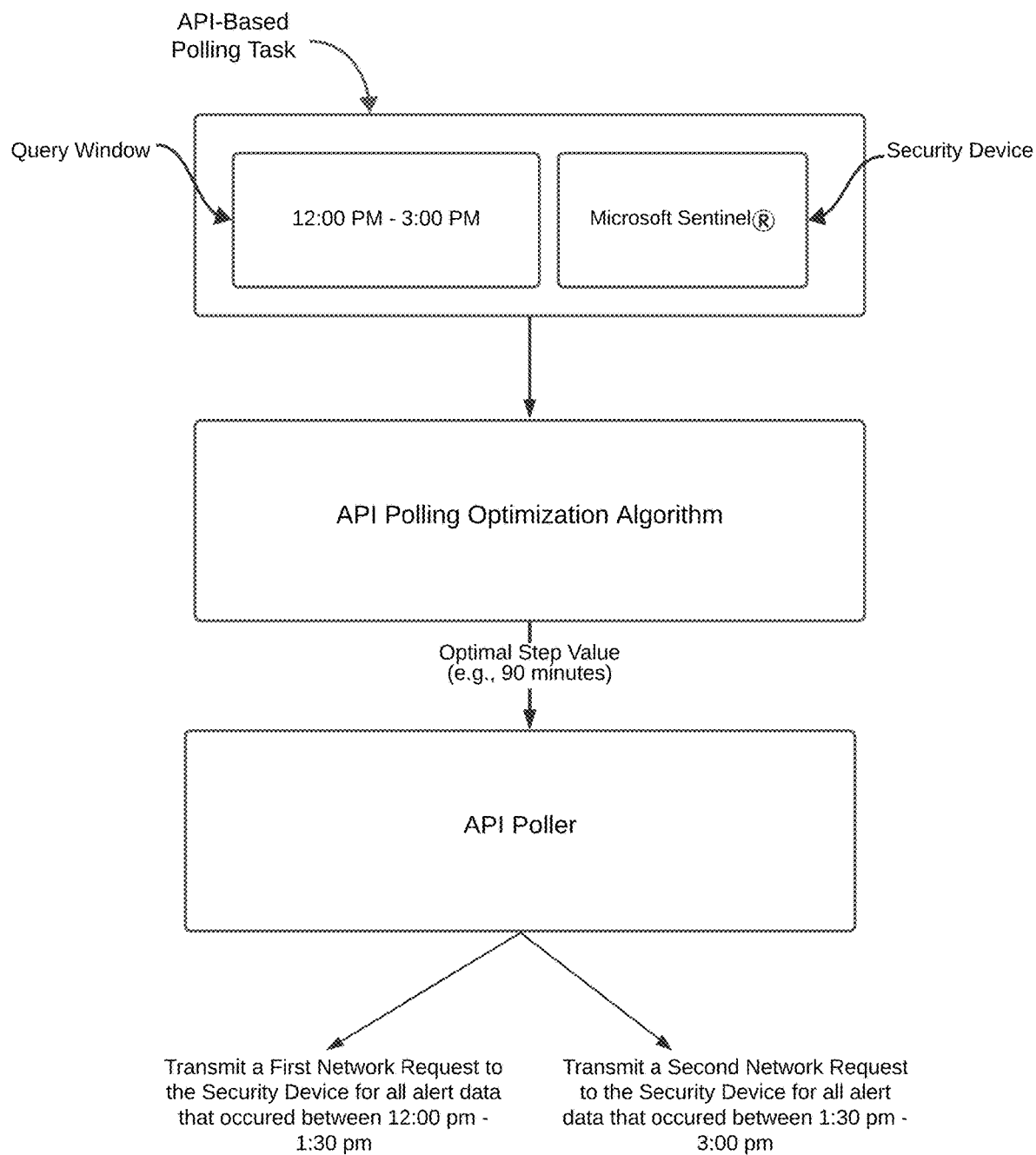
FIG. 4 illustrates an example of an API-based polling task and using the API polling optimization algorithm in accordance with one or more embodiments of the present application.

In one or more embodiments, each API-based polling task identified by S210 may specify a security device or an API endpoint associated with the security device, as shown generally by way of example in FIG. 4. The security device or the API endpoint of the security device, in such embodiments, may provide a respective API-based polling task with a point of access (e.g., an entry point, a URL endpoint, etc.) for retrieving data and/or interacting with the specified security device or the specified API endpoint of the security device.

Additionally, or alternatively, in one or more embodiments, each API-based polling task identified by S210 may further specify a query window parameter, as shown generally by way of example in FIG. 4. The query window parameter, in such embodiments, may instruct a respective API-based polling task, upon execution, to retrieve all data from a target API endpoint or a target security device that falls within the time frame or time span specified by the query window parameter of the respective API-based polling task.

For instance, in a non-limiting example, S210 may function to identify an API-based polling task associated with obtaining alert data (e.g., raw event data or the like) from Microsoft Sentinel® that occurred between 1:00 μm and 3:00 pm (e.g., query window). In such a non-limiting example, a system or service implementing method 200 may function to execute the API-based polling task by sending one or more network requests to Microsoft Sentinel® (e.g., the security device) or an API endpoint associated with Microsoft Sentinel® and, in turn, the system or service may receive all alert data (e.g., raw security alerts, raw event data, or the like) identified (e.g., observed, captured, etc.) by Microsoft Sentinel® within the query window (e.g., 1:00 μm and 3:00 pm).

In another non-limiting example, S210 may function to identify an API-based polling task associated with obtaining event data from Microsoft Defender® that occurred between 4:00 am and 11:00 am (e.g., query window). In such a non-limiting example, a system or service implementing method 200 may function to execute the API-based polling task by sending one or more network requests to Microsoft Defender® (e.g., the security device) or an API endpoint associated with Microsoft Defender® and, in turn, the system or service may receive all event data (e.g., raw security events or the like) identified (e.g., observed, captured, etc.) by Microsoft Defender® within the query window (e.g., 4:00 am and 11:00 am).

In another non-limiting example, S210 may function to identify an API-based polling task associated with obtaining log data from Netskope® that occurred between 5:00 μm and 8:00 pm (e.g., query window). In such a non-limiting example, a system or service implementing method 200 may function to execute the API-based polling task by sending one or more network requests to Netskope® (e.g., the security device) or an API endpoint associated with Netskope and, in turn, the system or service may receive all log data (e.g., raw logs or the like) identified (e.g., observed, captured, etc.) by Netskope® within the query window (e.g., 5:00 μm and 8:00 pm).

It shall be recognized that, in one or more embodiments, the data returned from any given polling task (e.g., polling run or the like) may be considered raw data (e.g., data that has not been processed by the cybersecurity event detection and response service implementing method 200). In such embodiments, the raw data may include, but should not be limited to, log data (e.g., a plurality of logs, etc.), security event data (e.g., a plurality of raw security events, a plurality of vendor-specific events, etc.), security alert data (e.g., a plurality of raw security alerts, a plurality of vendor-specific alerts, etc.), activity data occurring at, within, or involving one or more digital or computing assets of a subject subscriber, and/or any other suitable type of data.

It shall be further recognized that, in one or more embodiments, each distinct API-based polling task may be designed to retrieve or fetch data from a target security device or integration for a target subscriber (e.g., only one subscriber). In this way, each distinct API-based polling task may be optimized to obtain (e.g., fetch, ingest, etc.) and/or process new data (e.g., alert data, event data, etc.) of a particular subscriber as quickly as possible. Stated another way, in one or more embodiments, each API-based polling task may be individually configured for not only the API operating requirements of a given security device or integration but also the predicted amount of data returned from the given security device or integration for the respective subscriber, which will be described in greater detail herein. In other words, each API-based polling task may be configured on a per-subscriber basis to account for the specific data volume, event frequency, and data retrieval patterns specific to that subscriber, thereby ensuring optimal polling efficiency while preventing excessive compute resource usage and maintaining real-time or near real-time cybersecurity event detection.

In one or more embodiments, a system or service implementing method 200 may function to generate, via one or more computers, a polling task (e.g., API polling task or the like) that may be configured to retrieve raw event data of a target subscriber that occurred during a target time span from a third-party security service. For instance, in a non-limiting example, the system or service implementing method 200 may generate an API polling task configured to query a third-party security service (e.g., a service external to the cybersecurity event detection and response service) for all raw event data associated with a target subscriber that occurred between 12:00 PM and 3:00 PM.

2.20 Commencing an API Polling Optimization Algorithm

S220, which includes commencing an API polling optimization algorithm, may function to commence an instance of an API polling optimization algorithm in response to identifying an API-based polling task. An API polling optimization algorithm, as generally referred to herein, may include a set of computer instructions that, when executed, computes an optimal polling interval for a subject API-based polling task that is optimized for data retrieval and subsequent system processing of the data. It shall be recognized that the phrase "API polling optimization algorithm" may be interchangeably referred to herein as a "polling optimization algorithm", a "data retrieval optimization algorithm", a "data fetching optimization algorithm", or the like.

It shall be recognized that, in one or more embodiments, a system or service implementing method 200 may function to commence or execute the API polling optimization algorithm in response to identifying, obtaining, or generating a respective polling task. For instance, in a non-limiting example, in response to S210 generating a respective polling task, S220 may function execute the set of computer instructions associated with the API polling optimization algorithm to compute, in real-time, an optimal polling frequency control value (e.g., optimal step value or the like) for the respective polling task and, in turn, use the computed optimal polling frequency control value to perform the respective polling task.

In another non-limiting example, in response to identifying, obtaining, or generating a respective polling task, S220 may function to execute the set of computer instructions associated with the API polling optimization algorithm to compute, in real-time, an optimal polling frequency control value for the respective polling task before the system or service executes or commences an execution of the respective polling task. Accordingly, in such a non-limiting example, the system or service implementing method 200, a computer, a poller, or any other suitable processing device may use the computed optimal polling frequency control value to perform the respective polling task.

In another non-limiting example, in response to identifying, obtaining, or generating a respective polling task, S220 may function to commence an execution of the respective polling task. In such a non-limiting example, the set of computer instructions associated with the API polling optimization algorithm may be embedded within or included in the respective polling task itself. As a result, before generating any network requests (e.g., API requests) to perform the respective polling task, the respective polling task may first invoke (or execute) the API polling optimization algorithm to compute, in real-time, an optimal polling frequency control value. At least one technical advantage of such a non-limiting example, may ensure that the respective polling task dynamically (e.g., automatically) self-optimizes its polling parameters before initiating any network requests to a respective API endpoint for which the respective polling task is configured to retrieve raw event data. For instance, if a subject polling task is configured to fetch raw event data from Microsoft Sentinel®, the subject polling task may first be configured to invoke (or execute) the API polling optimization algorithm to compute an optimal polling frequency control value before generating and transmitting API requests to Microsoft Sentinel® to perform the subject polling task. In other words, in some embodiments, the polling step value (e.g., optimal polling frequency control value) may be unknown at the time the respective polling task was created and is dynamically computed in real-time based on historical polling performance data rather than being assigned a predefined default polling step value (e.g., a respective polling task is not configured with a predefined or default polling step value but instead determines an optimal polling step value for the respective polling task only after execution of the respective polling task begins).

In one or more embodiments, via one or more computers, the API polling optimization algorithm may function to obtain, for each polling run of a predetermined number of polling runs (e.g., past ten (10) polling runs, past five (5) polling runs, etc.), polling metric data (e.g., polling performance data or the like) associated with a target or subject API-based polling task. The polling metric data, in one or more embodiments, may include an optimal polling step value (e.g., optimal polling frequency control value) that was used for a respective polling run, memory usage data that indicates the amount of memory used for the respective polling run, and/or the total processing time of the respective polling run.

It shall be recognized that, in one or more embodiments, a system or service implementing method 200 may function to determine for each polling run of the predetermined number of polling runs an amount of memory used or consumed for a respective polling run using a computer processor (e.g., processor) that tracks how much memory has been allocated to the respective polling run during the period of executing the respective polling run. It shall be further recognized that, in one or more embodiments, a system or service implementing method 200 may function to determine for each polling run of the predetermined number of polling runs a polling run start time using a computer processor (e.g., processor) that tracks a start time of the respective polling run (e.g., a clock time at which the polling run was initiated). It shall be further recognized that, in one or more embodiments, a system or service implementing method 200 may function to determine for each polling run of the predetermined number of polling runs a polling run end time using a computer processor (e.g., processor) that tracks an end time of the respective polling run (e.g., a clock time at which the polling run was completed). It shall be further recognized that the computer processor may track the polling metric data (e.g., polling performance data) while the respective polling run is being performed or after the respective polling run is performed.

Additionally, or alternatively, in one or more embodiments, the system or service implementing method 200 may use the computer processor to access computer memory indicative of compute resource utilization and execution timestamps associated with the respective polling run.

In one or more embodiments, before a memory-informed candidate polling step value or a time-informed candidate polling step value is computed for the target or subject API-based polling task, the API polling optimization algorithm may determine and/or identify if the polling step value was constant (e.g., the same) over a predetermined number of historical polling runs (e.g., last ten (10) polling runs).

Accordingly, in one or more embodiments, if the polling step value was not constant (e.g., changed) over the last ten (10) polling runs, the API polling optimization algorithm may use the polling step value of the previous polling run (e.g., most-recent polling run) when executing a new polling run associated with the target or subject API-based polling task. Conversely, in one or more embodiments, if the polling step value was constant (e.g., has not changed) within the last ten (10) polling runs, the API polling optimization algorithm may function to compute a new optimal polling step value based on the polling performance data of the last ten (10) polling runs before executing a new polling run associated with the target or subject API-based polling task.

In other words, in one or more embodiments, the API polling optimization algorithm may function to continuously update or recompute the optimal polling step value after a predetermined number of polling runs (e.g., last 10 polling runs) have been executed in which the polling step value is constant or remained unchanged over the predetermined number of polling runs.

In one or more embodiments, before computing an optimal polling frequency control value (e.g., optimal polling step value) for a respective polling task, the system or service implementing method 200 may function to source, from a computer database, a respective optimal polling frequency control value used for a predetermined number of historical polling runs (e.g., at least ten (10) polling runs, at least twenty (20) polling runs, etc.) associated with the respective polling task. In one or more embodiments, based on or in response to the sourcing the respective optimal polling frequency control value used for the predetermined number of historical polling runs associated with the respective polling task, the system or service implementing method 200 may function to assess, in real-time or near real-time, whether the respective optimal polling frequency control value has been a same optimal polling frequency control value over the predetermined number of historical polling runs.

Accordingly, in one or more embodiments, the system or service implementing method 200 may function to bypass computing the optimal polling frequency control value for the respective polling task when the respective optimal polling frequency control value has not been the same optimal polling frequency control value over the predetermined number of historical polling runs. For instance, in a non-limiting example, if the last ten polling runs recorded the following optimal polling frequency control values: 5 minutes for polling run 1, 4 minutes for polling run 2, 6 minutes for polling run 3, 7 minutes for polling run 4, 7 minutes for polling run 5, 13 minutes for polling run 6, 4 minutes for polling run 7, 5 minutes for polling run 8, 13 minutes for polling run 9, and 4 minutes for polling run 10, the system or service implementing method 200 may identify that the optimal polling frequency control values varied over last ten polling runs (e.g., not the same). Consequently, rather than computing a new optimal polling frequency control value, the system or service implementing method 200 may use the most recent optimal polling frequency control value—4 minutes—from the most recent polling run for the respective polling task.

Alternatively, in one or more embodiments, the assessment may indicate that the respective optimal polling frequency control value has been the same optimal polling frequency control value over the predetermined number of historical polling runs and, in turn, the system or service implementing method 200 may function to compute a new optimal polling frequency control value in response to the assessment indicating the respective optimal polling frequency control value has been the same optimal polling frequency control value over the predetermined number of historical polling runs. For instance, in a non-limiting example, if the last ten (10) polling runs associated with the respective polling task recorded the following optimal polling frequency control values: 10 minutes for polling run 1, 10 minutes for polling run 2, 10 minutes for polling run 3, 10 minutes for polling run 4, 10 minutes for polling run 5, 10 minutes for polling run 6, 10 minutes for polling run 7, 10 minutes for polling run 8, 10 minutes for polling run 9, and 10 minutes for polling run 10, the system or service may proceed to computing a new optimal polling frequency control value for the respective polling task in response to determining the respective optimal polling frequency control value has been the same optimal polling frequency control value over the predetermined number of historical polling runs.

Figure 3:
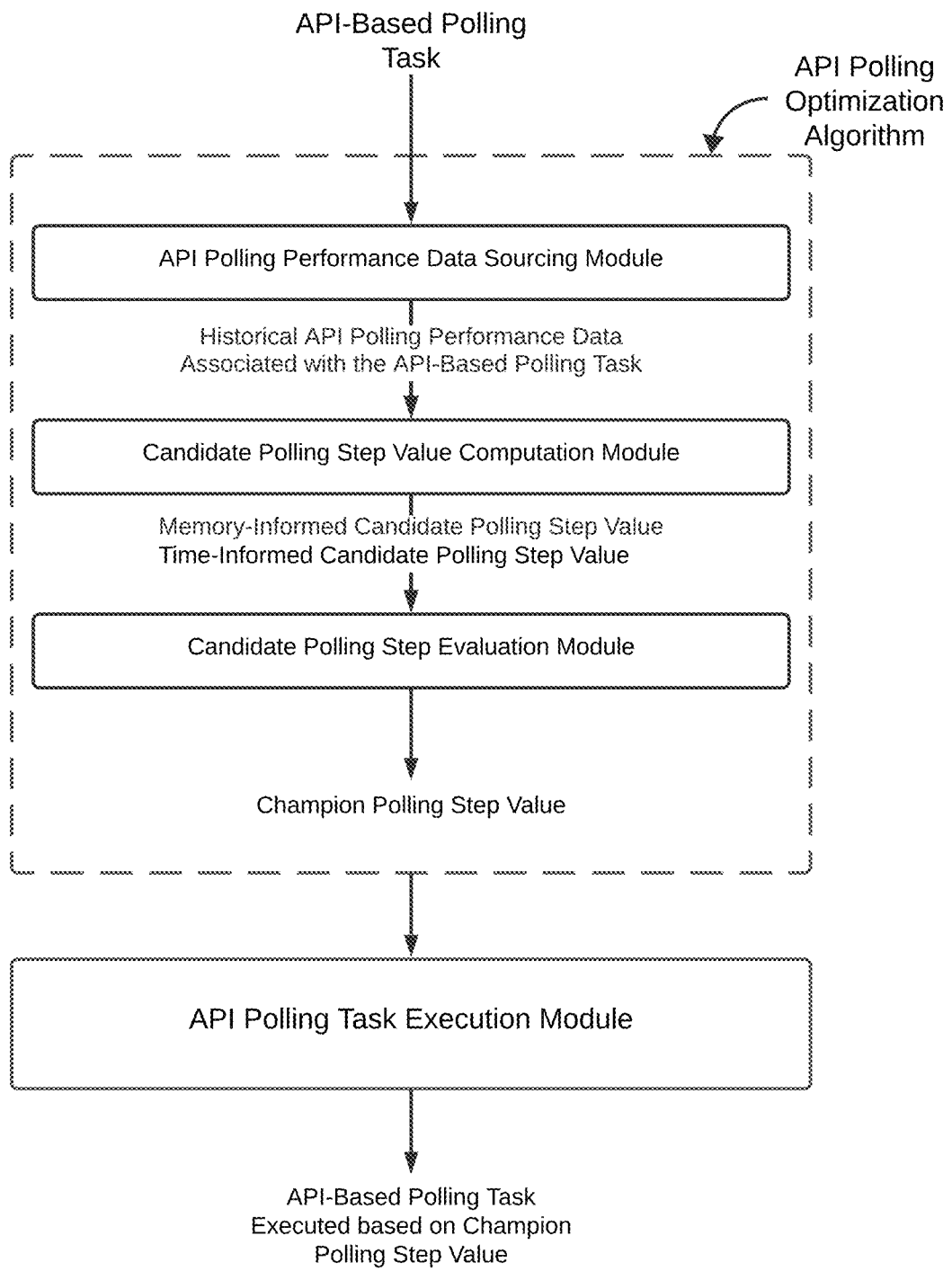
FIG. 3 illustrates an example schematic of using an API polling optimization algorithm in accordance with one or more embodiments of the present application.

In one or more embodiments, the API polling optimization algorithm may function to output (or compute) an optimal polling step value (e.g., an optimal polling interval or the like) for each API-based polling task identified by S210, as shown generally by way of example in FIG. 3. A polling step value, as generally referred to herein, may define a temporal granularity or temporal interval for retrieving or polling data from a target API endpoint or the like. It shall be recognized that the computed polling step values may vary across different API-based polling tasks and even when the same API-based polling task is executed at a different time.

In one or more embodiments, S220 may function to dynamically compute, using the API polling optimization algorithm, an optimal polling step value (e.g., optimal polling interval or the like) for each API-based polling task identified by S210. In other words, each time a respective API-based polling task is run, commenced, or scheduled to run within the system or service implementing method 200, the system or service may function to dynamically compute, using the API polling optimization algorithm, an optimal polling step value for the respective API-based polling task. It shall be recognized that, in some embodiments, polling step values computed by the API polling optimization algorithm may not be stored in a database, thus S220 may function to automatically compute an optimal polling step value for a respective API-based polling task in response to S210 identifying, obtaining, or generating the respective API-based polling task.

Figure 5:
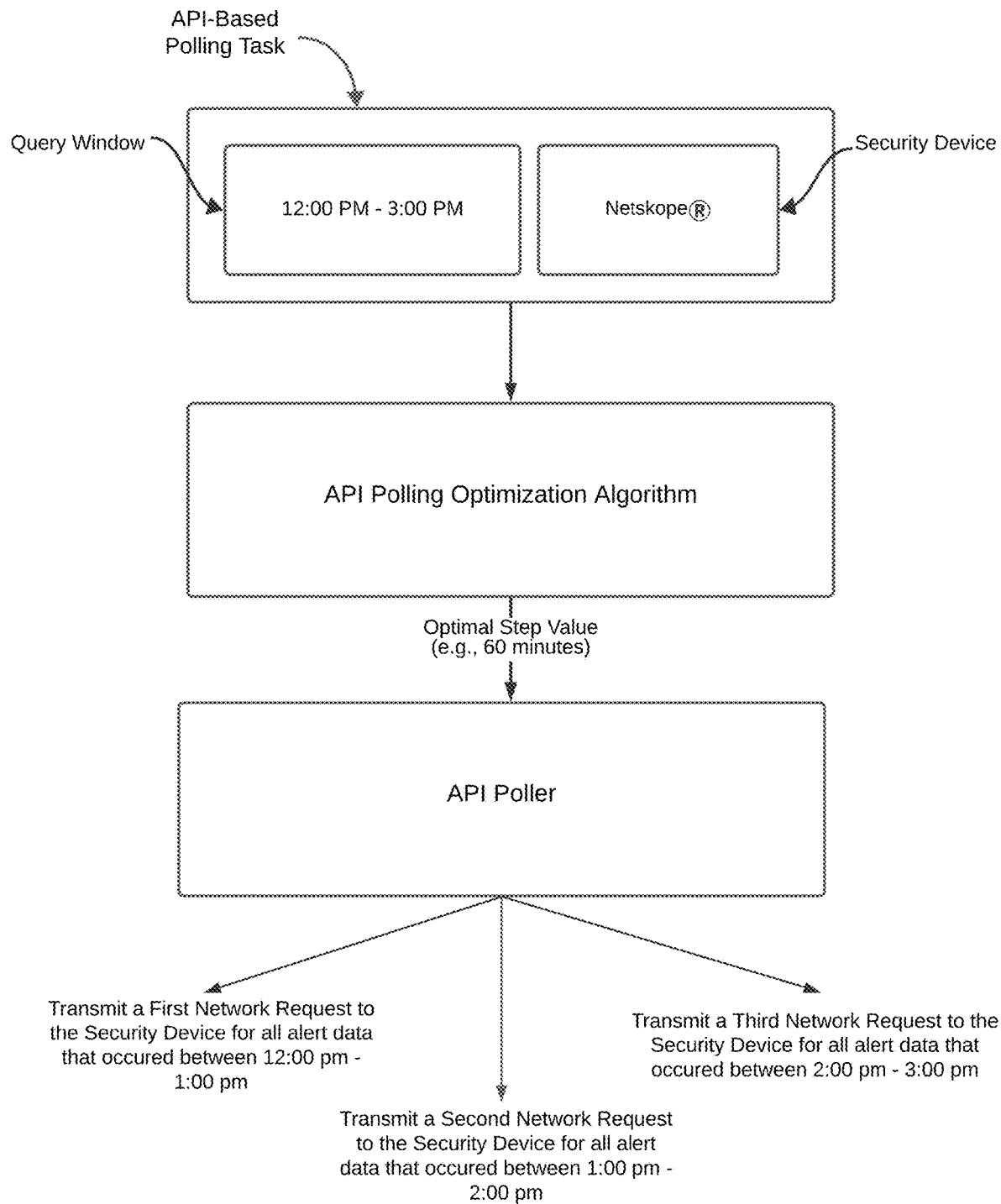
FIG. 5 illustrates an example of an API-based polling task and using the API polling optimization algorithm in accordance with one or more embodiments of the present application.

For instance, in a non-limiting example, S210 may function to identify an API-based polling task that may be configured to query a target API endpoint of a target security device for all alerts that occurred within a predetermined query window, such as 12:00 pm-3:00 μm. In such a non-limiting example, S220 may function to compute an optimal polling step value of one hour for the API-based polling task. Subsequently, the target query window may be divided into smaller polling intervals each spanning one-hour (e.g., a polling step length of one hour), such as 12:00 pm-1:00 μm, 1:00 pm-2:00 pm, and 2:00 pm-3:00 pm, as shown generally by way of example in FIG. 5.

Accordingly, in such a non-limiting example, executing the API-based polling task may include configuring and executing a distinct network request for each distinct one-hour polling interval (e.g., each distinct polling step length of one hour). For example, a system or service implementing method 200 may function to configure and/or execute a first network request (e.g., a first API call or the like) that obtains all alerts observed by the target security device between 12:00 µm and 1:00 pm, a second network request (e.g., a second API call or the like) that obtains all alerts observed by the target security device between 1:00 µm and 2:00 µm, and a third network request (e.g., a third API call or the like) that obtains all alerts observed by the target security device between 2:00 µm and 3:00 pm, as shown generally by way of example in FIG. 5. In other words, in some embodiments, the system or service implementing method 200 may execute or perform the API-based polling task over multiple sequential time-based intervals instead of retrieving all raw events in a single large network request covering the entirety of the predetermined query window.

At least one technical advantage of computing an optimal polling step value on a per polling task basis may enable a system or service implementing method 200 to optimize data retrieval and subsequent processing of the data by accounting for forecasted data volume and technology-specific constraints.

An example process of computing an optimal polling step value using the above-described API polling optimization algorithm will now be described.

Sourcing API Polling Performance Data

In one or more embodiments, based on commencing the API polling optimization algorithm to determine the optimal polling step value for a target API-based polling task, the API polling optimization algorithm may function to source API polling performance data for a predetermined number of historical polling steps and/or polling runs previously executed by the target API-based polling task. A polling run, as generally referred to herein, may represent an individual instance of executing a respective API-based polling task for a target query window and may include one or more polling steps. A polling step, as generally referred, may be a discrete polling task within a respective polling run, typically corresponding to a specific time interval for data polling. It shall be recognized that the phrase "API polling performance data" may also be interchangeably referred to herein as "API polling metric data," "polling performance data" or the like.

For instance, in a non-limiting example, a subject API-based polling task may be scheduled to poll data from a target API endpoint of a target security device for every hour of every day. In such a non-limiting example, over a twenty-four (24) hour period, the subject API-based polling task may have executed 24 polling runs (e.g., a first polling run to collect alert data from 12:00 am-1:00 am, a second polling run to collect alert data from 1:00 am to 2:00 am, a third polling run to collect alert data from 2:00 am-3:00 am, and so on). In such a non-limiting example, each polling run may have executed three (3) distinct polling steps over the respective period, each polling step representing a distinct network request to the same API endpoint of the same security device for a distinct time span. It shall be recognized, in such a non-limiting example, each polling step may have a step length of twenty minutes, as described in more detail below.

For instance, with continued reference to the above non-limiting example, the first polling step of the first polling run, in one or more embodiments, may include executing a first network request for a first time span (e.g., 12:00 am-12:20 am) to obtain, from the security device, alert data (e.g., raw event data, etc.) of a respective subscriber that occurred within the first time span (e.g., 12:00 am-12:20 am). The second polling step of the first polling run, in one or more embodiments, may include executing a second network request for a second time span (e.g., 12:20 am-12:40 am) to obtain, from the security device, alert data (e.g., raw event data, etc.) of the respective subscriber that occurred within the second time span (e.g., 12:20 am-12:40 am). The third polling step of the first polling run, in one or more embodiments, may include executing a third network request for a third time span (e.g., 12:40 am-1:00 am) to obtain, from the security device, alert data (e.g., raw event data, etc.) of the respective subscriber that occurred within the third time span (e.g., 12:40 am-1:00 am).

It shall be recognized that, in one or more embodiments, a system or service implementing method 200 may function to collect and store polling performance data for each distinct polling step executed by the system or service implementing method 200. In such embodiments, the polling performance data may include memory usage data that may indicate the amount of memory used by the system or service to obtain the requested data (e.g., alert data or the like) for a respective polling step, a step processing time that indicates the amount of time the respective polling step took to download the requested data and for the system or service to perform one or more processing steps on the requested data, and a corresponding length of the respective polling step. It shall be further recognized that, in one or more embodiments, the polling performance data may be stored within a database, a BigQuery data table, or any other suitable data storage system.

It shall be recognized that, in one or more embodiments, during or after the execution of each respective polling step, the system or service implementing method 200 may function to determine, for a subject polling step, an amount of computational time and compute resources used to perform the subject polling step using a computer processor that tracks a start time of the subject polling step (e.g., a clock time at which the subject polling step was initiated), an end time of the subject polling step (e.g., a clock time at which the subject polling step was completed), and how much memory has been allocated to the subject polling step (or consumed by the subject polling step) between the start time and the end time of the subject polling step. Accordingly, in one or more embodiments, the system or service may function to write the amount of computational time and compute resources used to perform the subject polling step into a computer database.

Figure 6:
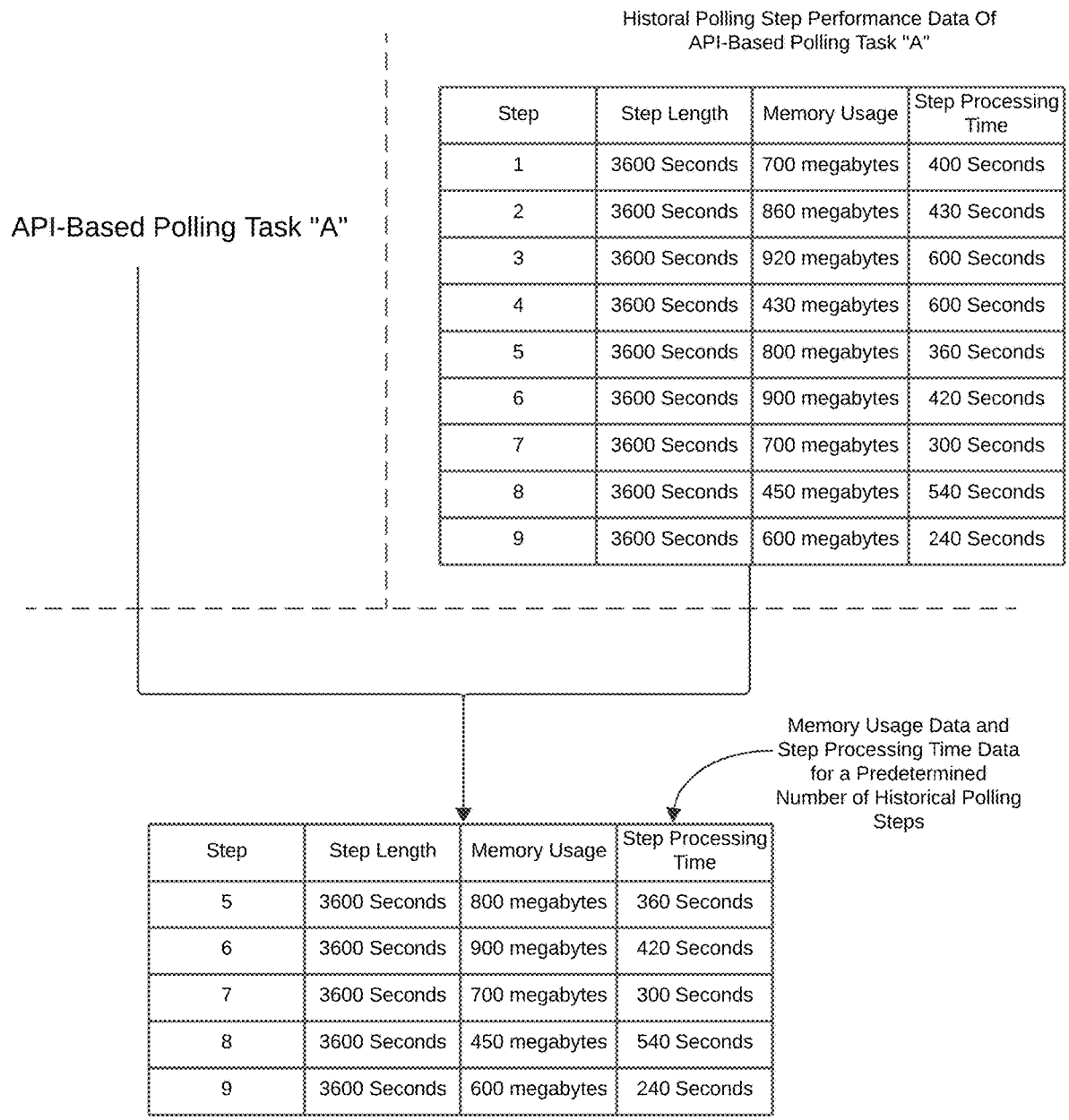
FIG. 6 illustrates an example of API polling performance data in accordance with one or more embodiments of the present application.

In one or more embodiments, based on commencing the API polling optimization algorithm to determine the optimal polling step value for a respective API-based polling task, the API polling optimization algorithm may function to source, from a computer database, memory usage data and step processing time data for each polling step of a predetermined number of historical polling steps executed by the respective API-based polling task, as shown generally by way of example in FIG. 6. The predetermined number of historical polling steps, in such embodiments, may be set to ten (10) historical polling steps (e.g., the ten most recently executed polling steps associated with the respective API-based polling task), nine (9) historical polling steps (e.g., the nine most recently executed polling steps associated with the respective API-based polling task), eight (8) historical polling steps (e.g., the eight most recently executed polling steps associated with the respective API-based polling task), seven (7) historical polling steps (e.g., the seven most recently executed polling steps associated with the respective API-based polling task), six (6) historical polling steps (e.g., the six most recently executed polling steps associated with the respective API-based polling task), five (5) historical polling steps (e.g., the five most recently executed polling steps associated with the respective API-based polling task), four (4) historical polling steps (e.g., the four most recently executed polling steps associated with the respective API-based polling task), three (3) historical polling steps (e.g., the three most recently executed polling steps associated with the respective API-based polling task), or any other suitable number of historical polling steps associated with the respective API-based polling task.

For instance, in a non-limiting example, based on commencing the API polling optimization algorithm to determine the optimal polling step value for a target API-based polling task, the API polling optimization algorithm may function to obtain or source API polling performance data for a predetermined number of most recent polling steps executed by the target API-based polling task (e.g., five (5) most recent polling steps, ten (10) most recent polling steps, etc.). In such a non-limiting example, the first polling step of the five most recent polling steps may indicate the first polling step used eight-hundred (800) megabytes of memory, the step processing time was five hundred and forty (540) seconds, and the length of the first polling step was 3600 seconds (e.g., one hour); the second polling step of the five most recent polling steps may indicate the second polling step used nine-hundred (900) megabytes of memory, the step processing time was six hundred (600) seconds, and the length of the second polling step was 3600 seconds (e.g., one hour); the third polling step of the five most recent polling steps may indicate the third polling step used seven-hundred (700) megabytes of memory, the step processing time was four hundred and eighty (480) seconds, and the length of the third polling step was 3600 seconds (e.g., one hour); the fourth polling step of the five most recent polling steps may indicate the fourth polling step used one-hundred (100) megabytes of memory, the step processing time was one hundred and eighty (180) seconds, and the length of the fourth polling step was 3600 seconds (e.g., one hour); and the fifth polling step of the five most recent polling steps may indicate the fifth polling step used three-hundred (300) megabytes of memory, the step processing time was two hundred and forty (240) seconds, and the length of the fifth polling step was 3600 seconds (e.g., one hour).

Stated another way, in one or more embodiments, in response to generating, via one or more computers, a polling task that is configured to retrieve, from a third-party security service, raw event data of a target subscriber that occurred during a target time span, the system or service implementing method 200 may function to compute, via the one or more computers, an optimal polling frequency control value for the polling task in real-time. In such an embodiment, computing the optimal polling frequency control value in real-time may include automatically sourcing, from a computer database, polling performance data for a predetermined number of historical polling steps executed by the cybersecurity event detection and response service. Each historical polling step of the predetermined number of historical polling steps, in such an embodiment, may have retrieved a distinct set of historical raw event data of the target subscriber from the third-party security service for a distinct time interval.

For instance, in a non-limiting example, the polling performance data for the predetermined number of historical polling steps sourced from the computer database may include a first amount of memory that was used during a first historical polling step of the predetermined number of historical polling steps, a second amount of memory that was used during a second historical polling step of the predetermined number of historical polling steps, a third amount of memory that was used during a third historical polling step of the predetermined number of historical polling steps, a fourth amount of memory that was used during a fourth historical polling step of the predetermined number of historical polling steps, and a fifth amount of memory that was used during a fifth historical polling step of the predetermined number of historical polling steps. Furthermore, in such a non-limiting example, the polling performance data for the predetermined number of historical polling steps sourced from the computer database may further include a first polling step length value measured in time that corresponds to the first historical polling step, a second polling step length value measured in time that corresponds to the second historical polling step, a third polling step length value measured in time that corresponds to the third historical polling step, a fourth polling step length value measured in time that corresponds to the fourth historical polling step, and a fifth polling step length value measured in time that corresponds to the fifth historical polling step.

Additionally, or alternatively, in one or more embodiments, the polling performance data for the predetermined number of historical polling steps sourced from the computer database may further include a first polling step execution time value that corresponds to a total time duration required to complete the first historical polling step, a second polling step execution time value that corresponds to the total time duration required to complete the second historical polling step, a third polling step execution time value that corresponds to the total time duration required to complete the third historical polling step, a fourth polling step execution time value that corresponds to the total time duration required to complete the fourth historical polling step, and a fifth polling step execution time value that corresponds to the total time duration required to complete the fifth historical polling step.

A polling step length or the like, as generally referred to herein, may be the duration of time that each polling step spans within a respective polling task. The polling step length may be controlled by the polling step value (e.g., optimal polling frequency control value), which may specify the time interval used to segment the query window for data retrieval from an API endpoint. For example, if a polling task has a three-hour query window and the computed optimal polling step value is three hours, the system or service may execute a single polling step covering the entire query window (e.g., the polling step length is 3 hours). If the computed optimal polling step value is 90 minutes, the system or service may divide the polling task into two distinct polling steps: one covering the first 90 minutes of the query window and another covering the remaining 90 minutes (e.g., the polling step length of each polling step is 90 minutes). If the computed optimal polling step value is one hour, the system or service may divide the polling task into three distinct polling steps, each covering a one-hour interval (e.g., the polling step length of each polling step is 1 hour).

An amount of memory used during a respective polling step, as generally referred to herein, may be the total memory consumed or utilized by the system or service implementing method 200, a poller, or a computer while executing the respective polling step. This may include memory allocated for retrieving, processing, and temporarily storing data obtained from the API endpoint during the respective polling step.

A polling step execution time value of a respective polling step, as generally referred to herein, may be the total elapsed time from the start of the respective polling step to the completion of the respective polling step. This may include the duration from when the respective polling step is commenced to when all associated processes of the respective polling step, such as data retrieval, downloading the retrieved data, processing the downloaded data, and storage, are completed.

Computing Candidate Polling Step Values

Figure 7:
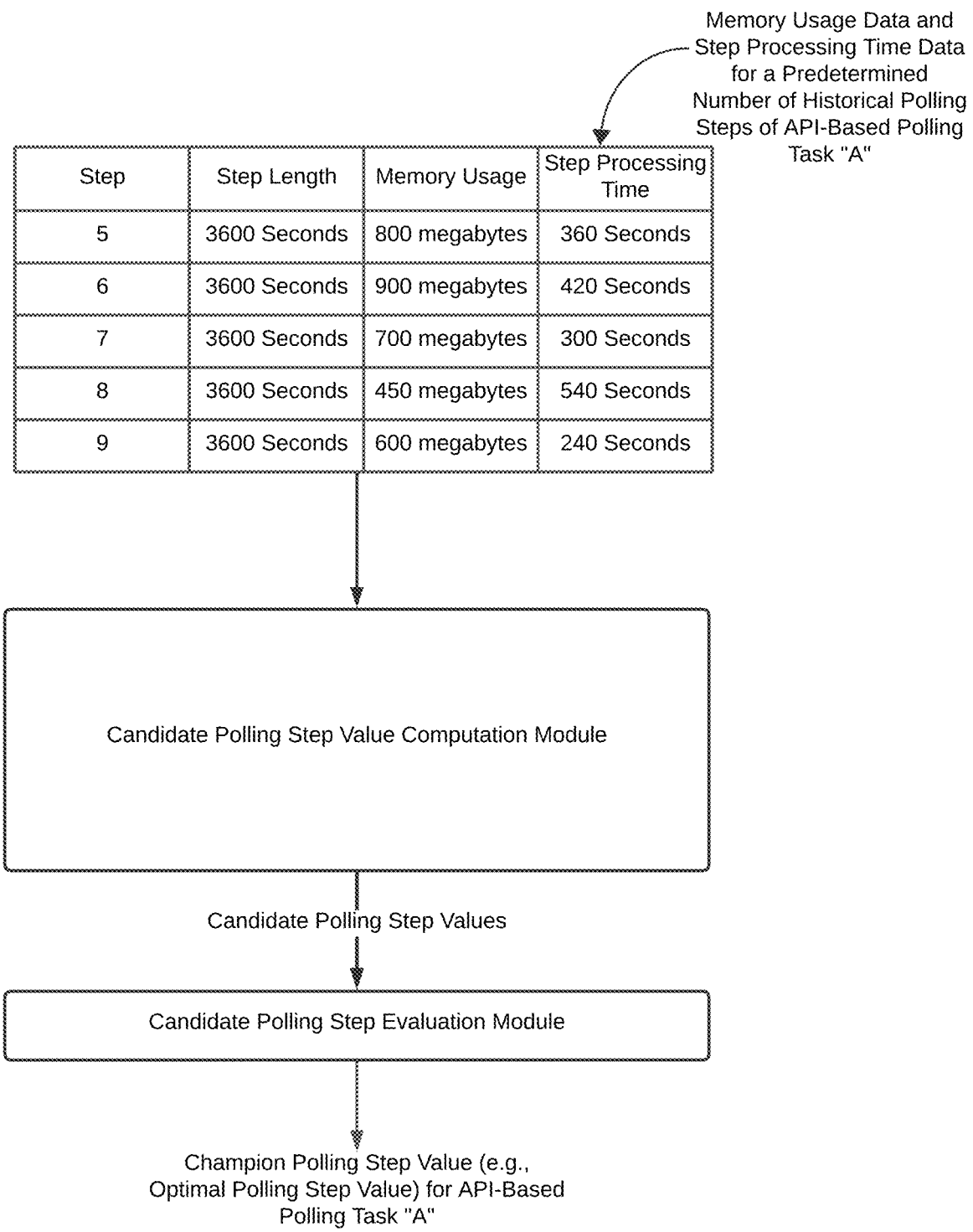
FIG. 7 illustrates an example of computing candidate polling step values in accordance with one or more embodiments of the present application.

Accordingly, in one or more embodiments, the API polling optimization algorithm may function to calculate a plurality of candidate polling step values (e.g., candidate polling intervals or the like) using the obtained API polling performance data, as shown generally by way of example in FIG. 7. A candidate polling step value, as generally referred to herein, may be a prospective time interval proposed by the API polling optimization algorithm to optimize the polling frequency of a respective API-based polling task. Optimizing the frequency of polling for a respective API-based polling task presents many technical advantages, such as, but not limited to, improving polling task speed, compute resource consumption, and network request performance.

Computing a Memory-Informed Candidate Polling Step Value

In one or more embodiments, the API polling optimization algorithm may function to calculate a candidate polling step value (e.g., a candidate optimal polling frequency control value) for a respective API-based polling task based on memory usage data of a predetermined number of historical polling steps (e.g., the five (5) most recent polling steps, the ten (10) most recent polling steps, etc.) executed or performed by the respective API-based polling task. In such embodiments, the API polling optimization algorithm may function to compute a memory-informed candidate polling step value using the equation Candidate Polling Step Value (Memory) =

$$\frac{\text{Memory Limit}}{\text{Maximum Memory Usage Per Step Length Second}}.$$

It shall be noted that the phrase "maximum memory usage per step length second" may also be referred to herein as "maximum kilobytes per step length second," or "maximum kilobytes per polling step length second."

It shall be further recognized that, in one or more embodiments, the memory limit may be predetermined or predefined by a system or service implementing method 200. Memory limit, as generally referred to herein, may be the maximum amount of memory that a single polling step is permitted to use during its execution. In other words, in some embodiments, the cybersecurity event detection and response service may impose a restriction on the memory consumption of each polling step to prevent an overutilization of compute resources.

Maximum memory usage per step length second, as generally referred to herein, may be the maximum or highest rate of memory consumption observed during any individual polling step of the predetermined number of historical polling steps. In other words, the above-mentioned memory-informed candidate polling equation (e.g., memory-informed candidate polling frequency control value) may function to compute a candidate polling step value that does not exceed the predefined memory limit threshold and prevents any single polling step from consuming excessive memory resources.

For instance, in a non-limiting example, the maximum amount of memory (e.g., memory limit) that a polling step may use or consume is four hundred (400) megabytes. In other words, in such a non-limiting example, the system or service implementing method 200 may prefer that a respective polling step uses or consumes no more than four hundred megabytes of memory. It shall be recognized that the maximum amount of memory (e.g., memory limit) that a polling step may use or consume, in one or more alternative embodiments, may be one hundred (100) megabytes, two hundred (200) megabytes, three hundred (300) megabytes, five hundred (500) megabytes, six hundred (600) megabytes, or any other suitable number of megabytes.

Additionally, in such a non-limiting example, to calculate an average memory usage per second for a target subset of polling steps associated with a target API-based polling task, the API polling optimization algorithm may function to source or obtain the memory usage data of the last five polling steps of the target API-based polling task, as described above. It shall be noted that, in such a non-limiting example, the API polling optimization algorithm may have been commenced to compute an optimal polling step value for the target API-based polling task. It shall be further noted that, in one or more embodiments, a system or service implementing method 200 may function to compute for each polling step of a predetermined number of polling steps (e.g., past five (5) polling steps, past ten (10) polling steps) an average megabytes per second value (e.g., MB/second).

Accordingly, in a non-limiting example, the last five polling steps of the target API-based polling task may have each had a polling step length of 3600 seconds (e.g., one hour) and utilized or consumed varying amounts of memory, such as 800 megabytes, 900 megabytes, 700 megabytes, 450 megabytes, and 600 megabytes. Stated another way, a first polling step of the last five polling steps may have had a polling step length of 3600 seconds and used 800 megabytes of memory, the second polling step of the last five polling steps may have had a polling step length of 3600 seconds and used 900 megabytes of memory, the third polling step of the last five polling steps may have had a polling step length of 3600 seconds and used 700 megabytes of memory, the fourth polling step of the last five polling steps may have had a polling step length of 3600 seconds and used 450 megabytes of memory, and the fifth polling step may have had a polling step length of 3600 seconds and used 600 megabytes of memory. Thus, based on obtaining the memory usage data for the last five polling steps associated with the target API-based polling task and the corresponding polling step length, the API polling optimization algorithm may function to compute, for each polling step, an average memory usage per second value (e.g., memory usage per second value or the like).

For instance, with continued reference to the above non-limiting example, the average memory usage per second of the first polling step of the last five polling steps of the target API-based polling task may be ~0.222 megabytes per second $$\left(\text{e.g., } \frac{800 \text{ MegaBytes}}{3600 \text{ seconds}} = 0.222 \, MB/\text{seconds}\right),$$

the average memory usage per second of the second polling step of the last five polling steps of the target API-based polling task may be 0.25 megabytes per second $$\left(\text{e.g., } \frac{900 \text{ MegaBytes}}{3600 \text{ seconds}} = 0.25 \, MB/\text{seconds}\right),$$

the average memory usage per second of the third polling step of the last five polling steps of the target API-based polling task may be ~0.194 megabytes per second $$\left(\text{e.g., } \frac{700 \text{ MegaBytes}}{3600 \text{ seconds}} = \sim 0.194 \, MB/\text{seconds}\right),$$

the average memory usage per second of the fourth polling step of the last five polling steps of the target API-based polling task may be 0.125 megabytes per second $$\left(\text{e.g., } \frac{450 \text{ MegaBytes}}{3600 \text{ seconds}} = 0.125 \, MB/\text{seconds}\right),$$

and the average memory usage per second of the fifth polling step of the last five polling steps of the target API-based polling task may be ~0.167 megabytes per second $$\left(\text{e.g., } \frac{600 \text{ MegaBytes}}{3600 \text{ seconds}} = \sim 0.167 \text{ MB/seconds}\right).$$

Accordingly, in such a non-limiting example, the maximum memory usage per step length second over the most recent five polling steps performed by the target API-based polling task is 0.25 megabytes per second. In other words, in one or more embodiments, the system or service implementing method 200 may function to determine, via one or more computers, a maximum memory usage per step length second value based on determining a maximum of the average memory usage per second values computed across the first polling step of the last five polling steps of the target API-based polling task, the second polling step of the last five polling steps of the target API-based polling task, the third polling step of the last five polling steps of the target API-based polling task, the fourth polling step of the last five polling steps of the target API-based polling task, and the fifth polling step of the last five polling steps of the target API-based polling task.

Thus, in such a non-limiting example, the memory-informed candidate polling step value for the target API-based polling task is approximately 26.67 minutes or 1,600 seconds $$\left(\text{e.g., } \frac{400 \text{ MegaBytes}}{0.25 \text{ megabytes per second}} = 1600 \text{ seconds}\right).$$

In another non-limiting example, in response to generating, via one or more computers, a polling task that is configured to retrieve, from a third-party security service, raw event data of a target subscriber that occurred during a target time span, the system or service implementing method 200 may function to compute, via the one or more computers, a memory-informed candidate polling step value (e.g., memory-informed candidate polling frequency control value) for the polling task in real-time. In such an embodiment, computing the memory-informed candidate polling frequency control value in real-time may include automatically sourcing, from a computer database, polling performance data for a predetermined number of historical polling steps executed by the cybersecurity event detection and response service. Each historical polling step of the predetermined number of historical polling steps, in such an embodiment, may have retrieved a distinct set of historical raw event data of the target subscriber from the third-party security service for a distinct time interval.

For instance, in a non-limiting example, the polling performance data for the predetermined number of historical polling steps sourced from the computer database may include a first amount of memory that was used during a first historical polling step of the predetermined number of historical polling steps, a second amount of memory that was used during a second historical polling step of the predetermined number of historical polling steps, a third amount of memory that was used during a third historical polling step of the predetermined number of historical polling steps, a fourth amount of memory that was used during a fourth historical polling step of the predetermined number of historical polling steps, and a fifth amount of memory that was used during a fifth historical polling step of the predetermined number of historical polling steps. Furthermore, in such a non-limiting example, the polling performance data for the predetermined number of historical polling steps sourced from the computer database may further include a first polling step length value measured in time that corresponds to the first historical polling step, a second polling step length value measured in time that corresponds to the second historical polling step, a third polling step length value measured in time that corresponds to the third historical polling step, a fourth polling step length value measured in time that corresponds to the fourth historical polling step, and a fifth polling step length value measured in time that corresponds to the fifth historical polling step.

Accordingly, in such a non-limiting example, the system or service implementing method 200 may function to compute, in real-time, a first average memory per second value that corresponds to the first historical polling step by dividing the first amount of memory that was used during the first historical polling step by the first polling step length value, a second average memory per second value that corresponds to the second historical polling step by dividing the second amount of memory that was used during the second historical polling step by the second polling step length value, a third average memory per second value that corresponds to the third historical polling step by dividing the third amount of memory that was used during the third historical polling step by the third polling step length value, a fourth average memory per second value that corresponds to the fourth historical polling step by dividing the fourth amount of memory that was used during the fourth historical polling step by the fourth polling step length value, and a fifth average memory per second value that corresponds to the fifth historical polling step by dividing the fifth amount of memory that was used during the fifth historical polling step by the fifth polling step length value. Stated another way, in one or more embodiments, the system or service implementing method 200 may function to compute, via one or more computers, a respective average memory per second value that corresponds to the first historical polling step, the second historical polling step, the third historical polling step, the fourth historical polling step, and the fifth historical polling step.

Furthermore, in such a non-limiting example, the system or service implementing method 200 may function to automatically compute the memory-informed candidate polling step value (e.g., memory-informed candidate polling frequency control value) for the polling task by determining, via the one or more computers, a maximum memory usage per step length second value based on determining a maximum of the first average memory per second value, the second average memory per second value, the third average memory per second value, the fourth average memory per second value, and the fifth average memory per second value and, in turn, computing the memory-informed candidate polling frequency control value by dividing a predetermined maximum memory limit defined via the cybersecurity event detection and response service by the maximum memory usage per step length second value.

It shall be recognized that, in some embodiments, the equation to compute the memory-informed candidate polling step value may further include an error adjustment term to account for factors such as failed API responses, API retries, API timeout issues, network failures, and API rate limits. The error adjustment term, in one or more embodiments, may be dynamically weighted based on the frequency and severity of errors observed over a predefined number of historical polling steps. In such embodiments, the memory-informed candidate polling step value may be computed using the equation $$\text{Candidate Polling Step Value (Memory)} = \frac{\text{Memory Limit}}{\text{Maximum Memory Usage Per Step Length Second}} + (W_{error} * N_{errors}),$$

where $W_{error}$ is a predetermined weight value (e.g., 0.30, 0.75, etc.) that adjusts for application programming interface failures and $N_{errors}$ corresponds to the total number of application programming interface errors (e.g., failed requests, timeouts, rate limits) in the past predetermined number of polling steps (e.g., past five (5) polling steps, past (10) ten polling steps, etc. The error adjustment term, in one or more embodiments, may ensure that the polling frequency dynamically adapts to fluctuating API reliability. If a high number of API failures is observed, the polling step value may be increased to allow for recovery and avoid overwhelming the third-party security service. Conversely, if few or no errors occur, the polling step value may remain optimized for maximum efficiency.

Computing a Time-Informed Candidate Polling Step Value

Additionally, in such embodiments, the API polling optimization algorithm may function to calculate another candidate polling step value for the target API-based polling task based on step processing time data of a predetermined number of most recent historical polling steps (e.g., the five (5) most recent polling steps, the ten (10) most recent polling steps, etc.) executed or performed by the target API-based polling task. In such embodiments, the API polling optimization algorithm may function to compute a time-informed candidate polling step value using the equation $$\text{Candidate Polling Step Value (Step Processing Time)} = \frac{\text{Step Processing Time Limit}}{\text{Maximum Execution Time Seconds Per Step Length Second}}.$$

It shall be recognized that, in one or more embodiments, the step processing time limit may be predetermined by a system or service implementing method 200. The step processing time limit, as generally referred to herein, may be the maximum amount of time that a single poller, computer, or server may be permitted to run (e.g., execute) or process a respective API-based polling task or polling step. It shall be recognized that, in one or more embodiments, a poller (e.g., API poller or the like) may be a computer-based component or computer-based mechanism responsible for initiating and managing the process of periodically querying an API or system endpoint to retrieve data, coordinating the execution of polling tasks, and/or handling API error handling and API retry mechanisms. In other words, in some embodiments, the step processing time limit may define an upper bound on the duration that any given polling step is allowed to execute.

Median execution time seconds per step length second, as generally referred to herein, may represent the statistical median of the time taken by a predetermined number of historical polling steps (e.g., the five most recent polling steps, the ten most recent polling steps, etc.) to execute relative to the step length duration. In other words, the above-mentioned time-informed candidate polling equation may function to compute a candidate polling step value that does not exceed the predefined step processing time and prevent any single polling step from exceeding its allocated processing time. It shall be recognized that the phrase "median execution time seconds per step length second" may also be referred to herein as "median execution time seconds per polling step length second" or the like.

For instance, in a non-limiting example, the maximum step processing time (e.g., step processing time limit) that a polling step may take to download and process data (e.g., raw event data) may be five minutes or 300 seconds. In other words, in such a non-limiting example, the system or service implementing method 200 may prefer that a respective polling step takes no longer than 300 seconds to complete the download and processing of data (e.g., raw event data). It shall be recognized that the maximum step processing time (e.g., step processing time limit), in one or more alternative embodiments, may be 800 seconds, 700 seconds, 600 seconds, 500 seconds, 400 seconds, 200 seconds, 100 seconds, or any other suitable amount of time.

Additionally, with continued reference to the above non-limiting example, to calculate the median execution time seconds per step length seconds for the target API-based polling task, the API polling optimization algorithm may function to source or obtain the step processing time data of the last five polling steps of the target API-based polling task. It shall be noted that, with continued reference to the above non-limiting example, the API polling optimization algorithm may have been commenced or invoked to compute the optimal polling step value for the target API-based polling task, as described above.

Accordingly, in such a non-limiting example, the last five polling steps associated with the target API-based polling task may have each had a polling step length of 3600 seconds (e.g., one hour) and had varying step execution or processing times, such as six minutes (e.g., 360 seconds), seven minutes (e.g., 420 seconds), five minutes (e.g., 300 seconds), nine minutes (e.g., 540 seconds), and four minutes (e.g., 240 seconds). Stated another way, a first polling step of the last five polling steps may have had a polling step length of 3600 seconds and had a polling step execution time of 360 seconds, a second polling step of the last five polling steps may have had a polling step length of 3600 seconds and had a polling step execution time of 420 seconds, a third polling step of the last five polling steps may have had a polling step length of 3600 seconds and had a polling step execution time of 300 seconds, a fourth polling step of the last five polling steps may have had a polling step length of 3600 seconds and had a polling step execution time of 540 seconds, and a fifth polling step of the last five polling steps may have had a polling step length of 3600 seconds and had a polling step execution time of 240 seconds. Thus, based on obtaining the step processing/execution time data for the last five polling steps associated with the target API-based polling task and the corresponding step length, the API polling optimization algorithm may function to compute, for each polling step, a corresponding step execution time seconds per step length seconds value (e.g., polling step execution time seconds per step length seconds).

For instance, with continued reference to the above non-limiting example, the execution time seconds per step length second value of the first polling step of the last five polling steps of the target API-based polling task may be 0.1

$$\left(\text{e.g.,} \frac{360 \text{ Execution Seconds}}{3600 \text{ seconds}} = 0.1 \text{ execution time seconds per step length second}\right),$$

the execution time seconds per step length second value of the second polling step of the last five polling steps of the target API-based polling task may be ~0.117

$$\left(\text{e.g.,} \frac{420 \text{ Execution Seconds}}{3600 \text{ seconds}} = \sim 0.117 \text{ execution time seconds per step length second}\right),$$

the execution time seconds per step length second value of the third polling step of the last five polling steps of the target API-based polling task may be ~0.083

$$\text{e.g.,} \frac{300 \text{ Execution Seconds}}{3600 \text{ seconds}} = \sim 0.083 \text{ execution time seconds per step length second}\right),$$

the execution time seconds per step length second of the fourth polling step of the last five polling steps of the target API-based polling task may be 0.15

$$\left(\text{e.g.,} \frac{540 \text{ Execution Seconds}}{3600 \text{ seconds}} = 0.15 \text{ execution time seconds per step length second}\right),$$

and the execution time seconds per step length second of the fifth polling step of the last five polling steps of the target API-based polling task may be ~0.067

$$\text{e.g.,} \frac{240 \text{ Execution Seconds}}{3600 \text{ seconds}} = \sim 0.067 \text{ execution time seconds per step length second}\right).$$

Accordingly, in such a non-limiting example, the API polling optimization algorithm may function to compute the median execution time seconds per step length second of the last five polling steps of the target API-based polling task as 0.1 execution time seconds per step length second (e.g., median of (0.1 execution time seconds per step length second, ~0.117 execution time seconds per step length second, ~0.083 execution time seconds per step length second, 0.15 execution time seconds per step length second, and ~0.067 execution time seconds per step length second).

Thus, in such a non-limiting example, the time-informed candidate polling step value for the target API-based polling task is 3,000 seconds or 50 minutes $$\left(\text{e.g.,} \frac{300 \text{ Seconds}}{0.1 \text{ execution seconds per step length second}} = 3,000 \text{ seconds}\right).$$

In another non-limiting example, in response to generating, via one or more computers, a polling task that is configured to retrieve, from a third-party security service, raw event data of a target subscriber that occurred during a target time span, the system or service implementing method 200 may function to compute, via the one or more computers, a time-informed candidate polling step value (e.g., time-informed candidate polling frequency control value) for the polling task in real-time.

In such an embodiment, computing the time-informed candidate polling frequency control value in real-time may include automatically sourcing, from a computer database, polling performance data for a predetermined number of historical polling steps executed by the cybersecurity event detection and response service. Each historical polling step of the predetermined number of historical polling steps, in such an embodiment, may have retrieved a distinct set of historical raw event data of the target subscriber from the third-party security service for a distinct time interval.

For instance, in a non-limiting example, the polling performance data for the predetermined number of historical polling steps sourced from the computer database may include a first polling step execution time value that corresponds to a total time duration required to complete the first historical polling step, a second polling step execution time value that corresponds to the total time duration required to complete the second historical polling step, a third polling step execution time value that corresponds to the total time duration required to complete the third historical polling step, a fourth polling step execution time value that corresponds to the total time duration required to complete the fourth historical polling step, and a fifth polling step execution time value that corresponds to the total time duration required to complete the fifth historical polling step. Furthermore, in such a non-limiting example, the polling performance data for the predetermined number of historical polling steps sourced from the computer database may further include a first polling step length value measured in time that corresponds to the first historical polling step, a second polling step length value measured in time that corresponds to the second historical polling step, a third polling step length value measured in time that corresponds to the third historical polling step, a fourth polling step length value measured in time that corresponds to the fourth historical polling step, and a fifth polling step length value measured in time that corresponds to the fifth historical polling step.

Accordingly, in such a non-limiting example, the system or service implementing method 200 may function to compute, in real-time, a first execution time seconds per step length second value that corresponds to the first historical polling step by dividing the first polling step execution time value of the first historical polling step by the first polling step length value of the first historical polling step, a second execution time seconds per step length second value that corresponds to the second historical polling step by dividing the second polling step execution time value of the second historical polling step by the second polling step length value of the second historical polling step, a third execution time seconds per step length second value that corresponds to the third historical polling step by dividing the third polling step execution time value of the third historical polling step by the third polling step length value of the third historical polling step, a fourth execution time seconds per step length second value that corresponds to the fourth historical polling step by dividing the fourth polling step execution time value of the fourth historical polling step by the fourth polling step length value of the fourth historical polling step, and a fifth execution time seconds per step length second value that corresponds to the fifth historical polling step by dividing the fifth polling step execution time value of the fifth historical polling step by the fifth polling step length value of the fifth historical polling step. Stated another way, in one or more embodiments, the system or service implementing method 200 may function to compute, via one or more computers, a respective execution time seconds per step length second value that corresponds to the first historical polling step, the second historical polling step, the third historical polling step, the fourth historical polling step, and the fifth historical polling step.

Furthermore, in such a non-limiting example, the system or service implementing method 200 may function to automatically compute the time-informed candidate polling step value (e.g., time-informed candidate polling frequency control value) for the polling task by determining, via one or more computers, a median execution time seconds per step length second value based on determining a median of the first execution time seconds per step length second value, the second execution time seconds per step length second value, the third execution time seconds per step length second value, the fourth execution time seconds per step length second value, and the fifth execution time seconds per step length second value and, in turn, computing the time-informed candidate polling frequency control value by dividing a predetermined maximum polling step processing time limit defined via the cybersecurity event detection and response service by the median execution time seconds per step length second value.

It shall be recognized that, in one or more embodiments, the memory-informed candidate polling step value and the time-informed candidate polling step value may be computed in-parallel (e.g., simultaneously) using one or more computers.

It shall be recognized that, in some embodiments, the equation to compute the time-informed candidate polling step value may further include an error adjustment term to account for factors such as failed API responses, API retries, API timeout issues, network failures, and API rate limits. The error adjustment term, in one or more embodiments, may be dynamically weighted based on the frequency and severity of errors observed over a predefined number of historical polling steps. In such embodiments, the time-informed candidate polling step value may be computed using the equation $$\text{Candidate Polling Step Value (Step Processing Time)} = \frac{\text{Step Processing Time Limit}}{\text{Median Execution Time Seconds Per Step Length Second}} + (W_{error} * N_{errors}),$$

where $W_{error}$ may be a predetermined weight value (e.g., 0.003, 0.30, 0.75, etc.) that adjusts for application programming interface failures and $N_{errors}$ corresponds to the total number of application programming interface errors (e.g., failed requests, timeouts, rate limits) in the past predetermined number of polling steps (e.g., past five (5) polling steps, past (10) ten polling steps, etc. The error adjustment term, in one or more embodiments, may ensure that the polling frequency dynamically adapts to fluctuating API reliability.

Electing a Champion Polling Step Value

Accordingly, in one or more embodiments, the API polling optimization algorithm may function to elect a champion polling step value based on an evaluation of the time-informed candidate polling step value and the memory-informed candidate polling step value computed for a respective API-based polling task. A champion polling step value, as generally referred to herein, may be the elected polling step value (or optimal polling step value) to be implemented by a respective poller, computer, or server (e.g., respective API poller or the like) for executing a respective API-based polling task. Stated another way, in one or more embodiments, a system or service implementing method 200 may function to automatically elect one of the memory-informed candidate polling frequency control value (e.g., memory-informed candidate polling step value) and the time-informed candidate polling frequency control value (e.g., time-informed candidate polling step value) as the optimal polling frequency control value (e.g., optimal polling step value) in response to assessing the memory-informed candidate polling frequency control value against the time-informed candidate polling frequency control value.

In one or more embodiments, the elected one of the memory-informed candidate polling frequency control value (e.g., memory-informed candidate polling step value) and the time-informed candidate polling frequency control value (e.g., time-informed candidate polling step value) may be greater than or smaller than a predefined polling frequency control value defined for the third-party security service for which the polling task corresponds. For instance, in a non-limiting example, the elected one of the memory-informed candidate polling frequency control value and the time-informed candidate polling frequency control value may be smaller than a static, predefined polling frequency control value defined for the third-party security service. In another non-limiting example, the elected one of the memory-informed candidate polling frequency control value and the time-informed candidate polling frequency control value may be greater than the static, predefined polling frequency control value defined for the third-party security service.

In one or more embodiments, the API polling optimization algorithm may elect the minimum or lesser candidate polling step of the memory-informed candidate polling step value and the time-informed candidate polling step value. Stated another way, in one or more embodiments, the API polling optimization algorithm may function to elect a champion step polling value using the equation Champion Polling Step Value=Minimum (Memory-Informed Candidate Polling Step Value, Time-Informed Candidate Polling Step Value).

For instance, with continued reference to the above non-limiting example, the API polling optimization algorithm may have computed two candidate polling step values for a target API-based polling task, such as the memory-informed candidate polling step value calculated to be approximately 1,600 seconds (or 26.67 minutes) and the time-informed candidate polling step value calculated to be 3,000 seconds (or 50 minutes). Accordingly, in such a non-limiting example, the champion step polling value would be the lesser of the memory-informed candidate polling step value and the time-informed candidate polling step value, which is the memory-informed candidate polling step value of 1,600 seconds (or 26.67 minutes).

In another non-limiting example, the API polling optimization algorithm may have computed two candidate polling step values for a given API-based polling task, such as a memory-informed candidate polling step value calculated to be approximately 600 seconds (or 10 minutes) and a time-informed candidate polling step value calculated to be 300 seconds (or 5 minutes). Accordingly, in such a non-limiting example, the champion step polling value would be the lesser of the memory-informed candidate polling step value and the time-informed candidate polling step value, which is the time-informed candidate polling step value of 300 seconds (or 5 minutes).

At least one technical advantage of electing the champion step polling value in this way may ensure the champion step polling value satisfies both system-defined memory usage constraints and system-defined step processing or execution time constraints.

It shall be further noted, in one or more embodiments, once a champion step polling value is elected, the API polling optimization algorithm may function to trim any microseconds associated with the elected champion step polling value. For instance, if the elected champion step polling value is 2,086.457 seconds, the algorithm may function to automatically adjust the champion step polling value to 2,086 seconds.

It shall be recognized, in one or more embodiments, when the API polling optimization algorithm is unable to source a predetermined number of polling steps for a respective API-based polling task, the elected champion polling step value used for the respective API-based polling task may be a system-default polling value defined for the corresponding security device.

It shall be further recognized that, in one or more embodiments, the system or service implementing method 200 may function to assess, in real-time, a subject memory-informed candidate polling frequency control value computed for a respective polling task against a subject time-informed candidate polling frequency control value computed for the respective polling task. It shall be further recognized that, in one or more embodiments, the system or service implementing method 200 may function to automatically elect, in real-time, one of the subject memory-informed candidate polling frequency control value and the subject time-informed candidate polling frequency control value computed for the respective polling task.

2.30 API-Based Polling Task Execution

S230, which includes API-based polling task execution, may function to execute a respective API-based polling task based on the champion polling step value (e.g., optimal polling step value) elected by the API polling optimization algorithm for the respective API-based polling task. In one or more embodiments, a poller (e.g., API poller or the like) may use the champion polling step value, which may be the optimal polling step computed by the API polling optimization algorithm, for executing the respective API-based polling task. In one or more embodiments, a poller, a computer, a server implemented by the cybersecurity event detection and response service may function to execute a respective polling task (e.g., an API-based polling task) based on a champion polling step value (e.g., optimal polling step value) elected by the API polling optimization algorithm for the respective polling task.

In one or more embodiments, the API polling optimization algorithm may function to compute an optimal step value (e.g., champion polling step value) of ninety minutes for a subject API-based polling task. The subject API-based polling task, in one or more embodiments, may be associated with obtaining alert data from a target security device (e.g., Microsoft Sentinel®, etc.) that occurred between 1:00 µm and 4:00 pm (e.g., query window) of a target day. It shall be noted that, in such embodiments, the system-default polling step value for the target security device may be three hours.

Accordingly, in such embodiments, the query window of the subject API-based polling task (e.g., 1:00 µm and 4:00 pm of the target day) may be partitioned into smaller, discrete sub-intervals based on the optimal polling step value computed for the subject API-based polling task (e.g., ninety-minute sub-intervals). For instance, the query window of the subject API-based polling task may be divided into ninety-minute segments, each representing a distinct period for data retrieval, such as 1:00 pm-2:30 pm and 2:30 pm-4:00 µm.

Accordingly, in such embodiments, instead of a poller executing a single network request to the target security device to obtain all alert data (e.g., raw event data) that occurred between 1:00 µm and 4:00 pm of the target day, the poller may function to execute a first network request to the target security device that is configured to obtain all alert data that occurred between 1:00 µm and 2:30 pm and a second network request to the target security device that is configured to obtain all alert data that occurred between 2:30 pm and 4:00 µm.

In another non-limiting example, the API polling optimization algorithm may function to compute an optimal step value (e.g., champion polling step value) of one hour for a target API-based polling task. The target API-based polling task, in one or more embodiments, may be associated with obtaining alert data (e.g., raw event data) from a target security device that occurred between 8:00 am and 11:00 am (e.g., query window) of a target day. It shall be noted that, in such embodiments, the system-default polling step value for the target security device may be three hours.

Accordingly, in such a non-limiting example, the query window of the target API-based polling task (e.g., 8:00 am and 11:00 am of the target day) may be partitioned into smaller, discrete sub-intervals based on the optimal polling step value computed for the target API-based polling task (e.g., one-hour sub-intervals). For instance, the query window of the target API-based polling task may be partitioned into hourly segments, each representing a distinct period for data retrieval, such as 8:00 am-9:00 am, 9:00 am-10:00 am, and 10:00 am-11:00 am.

Accordingly, in such embodiments, instead of a poller transmitting a single network request to the target security device to obtain all alert data that occurred between 8:00 am and 11:00 am of the target day, the poller may function to transmit a first network request to the target security device that is configured to obtain all alert data that occurred between 8:00 am-9:00 am, a second network request to the target security device that is configured to obtain all alert data that occurred between 9:00 am-10:00 am, and a third network request that is configured to obtain all alert data that occurred between 10:00 am-11:00 am.

It shall be noted that when memory usage data and polling step execution time data of a predetermined number of historical polling steps for a given poller are substantially below (e.g., 5% below, 10% below, 15% below, 20% below, 25% below, 30% below, 35% below, 40% below, 45% below, 50% below, 55% below, 60% below, 65% below, 70% below, 75% below, 80% below, 85% below, 90% below, 95% below, etc.) a predetermined maximum polling step memory limit (e.g., 400 megabytes) and a predetermined maximum polling step processing time (e.g., five minutes) for a predetermined of polling steps (e.g., at least five polling steps, at least ten polling steps, or the like), the API polling optimization algorithm may function to increase the polling step size for the given poller. In other words, when a subject poller consistently operates significantly below the above-mentioned polling step thresholds, a system or service implementing method 200 may function to increase the polling step value or polling step length of the subject poller to reduce the number of API request to the security device or API endpoint of the security device associated with the subject poller.

In one or more embodiments, the system or service implementing method 200 may function to identify a polling task that is configured to retrieve raw event data of a target subscriber that occurred during a target time span from a third-party security service and, in turn, compute an optimal polling frequency control value for the polling task in real-time in response to identifying the polling task. Accordingly, in response to computing the optimal polling frequency control value for the polling task, the system or service implementing method 200 may function to partition, via one or more computers, the target time span into a plurality of distinct sub-intervals of time based on the optimal polling frequency control value computed for the polling task.

For instance, in a non-limiting example, partitioning the target time span into the plurality of distinct sub-intervals of time may include partitioning the target time span into a first sub-interval of time that corresponds to a first distinct portion of the target time span, partitioning the target time span into a second sub-interval of time that corresponds to a second distinct portion of the target time span, wherein the second sub-interval of time does not overlap with the first sub-interval of time, and partitioning the target time span into a third sub-interval of time that corresponds to a third distinct portion of the target time span, wherein the third sub-interval of time does not overlap with the first sub-interval of time nor the second sub-interval of time. In such a non-limiting example, the target time span may be a six-hour period (e.g., 3:00 μm to 9:00 pm) and, in turn, partitioned into three distinct sub-intervals: 3:00 μm to 5:00 μm, 5:00 pm to 7:00 μm, and 7:00 μm to 9:00 pm, with each sub-interval spanning two hours and not overlapping with another sub-interval.

Additionally, or alternatively, in such a non-limiting example, the system or service implementing method 200 may function to automatically create, via one or more computers, a first distinct network request that is configured to retrieve, from the third-party security service, a respective portion of raw event data of the target subscriber that only corresponds to the first distinct portion of the target time span (e.g., 3:00 μm to 5:00 pm), a second distinct network request that is configured to retrieve, from the third-party security service, a respective portion of raw event data of the target subscriber that only corresponds to the second distinct portion of the target time span (e.g., 5:00 μm to 7:00 pm), and a third distinct network request that is configured to retrieve, from the third-party security service, a respective portion of raw event data of the target subscriber that only corresponds to the third distinct portion of the target time span (e.g., 7:00 pm to 9:00 pm). It shall be recognized that, in one or more embodiments, the system or service implementing method 200 may function to simultaneously create the first distinct network request, the second distinct network request, and the third distinct network request at the same time.

Additionally, or alternatively, in one or more embodiments, based on or in response to automatically creating, via one or more computers, the first distinct network request, the second distinct network request, and the third distinct network request, a poller, a computer, or a server of the cybersecurity event detection and response service may function to electronically transmit, over a computer network, the first distinct network request to an application programming interface endpoint of the third-party security service to retrieve the respective portion of the raw event data of the target subscriber that corresponds to the first distinct portion of the target time span; the second distinct network request to the application programming interface endpoint of the third-party security service to retrieve the respective portion of the raw event data of the target subscriber that corresponds to the second distinct portion of the target time span; and the third distinct network request to the application programming interface endpoint of the third-party security service to retrieve the respective portion of the raw event data of the target subscriber that corresponds to the third distinct portion of the target time span. Stated another way, in one or more embodiments, a poller, a server, or a computer of the cybersecurity service may function to automatically create a plurality of distinct network requests based on a computed optimal polling step value or the like and, in turn, automatically transmit, to an application programming interface endpoint of the third-party security service, the plurality of distinct network requests to optimally perform the polling task, wherein each distinct network request corresponds to a distinct sub-interval of time of the plurality of distinct sub-intervals of time and is configured to retrieve a respective portion of raw event data that corresponds to the distinct sub-interval of time of the plurality of distinct sub-intervals of time.

Accordingly, in one or more embodiments, the computer, the server, or the cybersecurity event detection and response service may function to receive the raw event data of the target subscriber from the third-party security service that occurred during the target time span in response to executing or transmitting the plurality of distinct network requests. For instance, with continued reference to the above non-limiting example, the computer, the server, or the cybersecurity event detection and response service may function to receive a first respective portion of the raw event data of the target subscriber that corresponds to the first distinct portion of the target time span in response to transmitting the first distinct network request to the application programming interface endpoint of the third-party security service, a second respective portion of the raw event data of the target subscriber that corresponds to the second distinct portion of the target time span in response to transmitting the second distinct network request to the application programming interface endpoint of the third-party security service, and a third respective portion of the raw event data of the target subscriber that corresponds to the third distinct portion of the target time span in response to transmitting the third distinct network request to the application programming interface endpoint of the third-party security service.

Generating Security Alerts

In one or more embodiments, based on or in response to receiving raw event data from a third-party security service, the system (e.g., system 100) or service implementing method 200 may function to generate, in real-time, one or more security alerts in response to the system (e.g., system 100) or service implementing method 200 processing the raw event data. For instance, in a non-limiting example, the raw event data obtained from the third-party security service may be routed to the security alert engine 110 and, in turn, the security alert engine may function to assess the raw event data using predetermined security threat detection logic. Accordingly, in such a non-limiting example, the security alert engine may output one or more security alerts in response to processing or assessing the raw event data.

Accordingly, in one or more embodiments, based on or in response to generating the one or more security alerts, the system or service implementing method 200 may function to execute, in real-time, a threat mitigation response that mitigates a security threat corresponding to the one or more security alerts. The threat mitigation response, in one or more embodiments, may include surfacing the security threat and the one or more security alerts in real-time to a threat reporting user interface accessible to a target subscriber, generating one or more proposed threat remediation actions for the one or more security alerts in real-time that, when implemented, mitigates the security threat corresponding to the one or more security alerts, and/or surfacing the one or more proposed threat remediation actions in real-time to the threat reporting user interface accessible to the target subscriber.

It shall be recognized that, in some embodiments, the one or more security alerts may include a compromised digital asset of the target subscriber. Accordingly, in such an embodiment, the system or service implementing method 200 may function to execute, in real-time, a threat mitigation response that mitigates a security threat corresponding to the compromised digital asset by automatically executing, in real-time, one or more automated threat remediation actions that adapts a configuration characteristic or an operating characteristic of one or more digital environments of the target subscriber to resolve the security threat associated with the compromised digital asset.

For instance, in a non-limiting example, the raw event data received from a third-party security service may include a network host of the target subscriber, and, in turn, the system or service implementing method 200 may function to generate a security alert based on assessing the raw event data. The security alert, in one or more embodiments, may include the network host of the target subscriber. Accordingly, in one or more embodiments, the system or service implementing method 200 may function to execute a threat mitigation response that mitigates a security threat associated with the security alert by automatically terminating existing network connections on the network host and preventing new network connections from digitally communicating with the network host of the target subscriber in response to detecting the network host of the target subscriber as compromised.

In another non-limiting example, the raw event data received from a third-party security service may include a user account of the target subscriber, and, in turn, the system or service implementing method 200 may function to generate a security alert based on assessing the raw event data. The security alert, in one or more embodiments, may include the user account of the target subscriber. Accordingly, in one or more embodiments, the system or service implementing method 200 may function to execute a threat mitigation response that mitigates a security threat associated with the security alert by automatically terminating the cloud computing environment of the target subscriber to automatically suspend or automatically cease digital events from occurring on the cloud computing environment of the target subscriber in response to detecting the cloud computing environment of the target subscriber as compromised.

In another non-limiting example, the raw event data received from a third-party security service may include a cloud access key of the target subscriber, and, in turn, the system or service implementing method 200 may function to generate a security alert based on assessing the raw event data. The security alert, in one or more embodiments, may include the cloud access key of the target subscriber. Accordingly, in one or more embodiments, the system or service implementing method 200 may function to execute a threat mitigation response that mitigates a security threat associated with the security alert by automatically disabling or automatically modifying the cloud access key of the target subscriber in response to detecting the cloud access key of the target subscriber as compromised.

In another non-limiting example, the raw event data received from a third-party security service may indicate that an application with a respective hash signature was executed, and, in turn, the system or service implementing method 200 may function to generate a security alert based on assessing the raw event data. The security alert, in one or more embodiments, may include information associated with the application and the respective hash signature. Accordingly, in one or more embodiments, the system or service implementing method 200 may function to execute a threat mitigation response that mitigates a security threat associated with the security alert by automatically blocking the respective hash signature to prevent the application associated with the respective hash signature from being re-executed in a digital environment of the target subscriber in response to detecting the respective hash signature as malicious.

2.40 Generating an API Polling Intelligence Interface

S240, which includes generating an API polling intelligence interface, may function to automatically or system-generate an API polling intelligence interface for a respective subscriber to visualize how the system or service implementing 200 manages and executes API-based polling tasks associated with the respective subscriber. The API polling intelligence interface may include one or more system-generated textual-based finding artifacts and/or one or more system-generated graphical-based finding artifacts that may function to provide evidence on how using the API polling optimization algorithm increases a polling efficiency for each poller (e.g., API poller or the like) of the respective subscriber.

In one or more embodiments, S240 may function to generate and display, on a web-based user interface of the cybersecurity event detection and response service, one or more graphical artifacts or visualization artifacts that explains how the poller performance of each individual poller associated with a respective subscriber was improved by using the API polling optimization algorithm. In other words, before using the API polling optimization algorithm to optimize a respective poller, the poller performance of the respective poller may have been hindered by inefficient polling parameters, whereas after using the API polling optimization algorithm to optimize the respective poller, the poller performance of the respective poller is likely to have improved significantly due to refinement in the polling parameters.

Accordingly, in one or more embodiments, the API polling interface of a respective subscriber may illustrate a performance disparity before and after using the API polling optimization algorithm on a respective poller of the respective subscriber to visually illustrate to the respective subscriber how the poller performance of the respective poller increased over time.

Figure 8A:
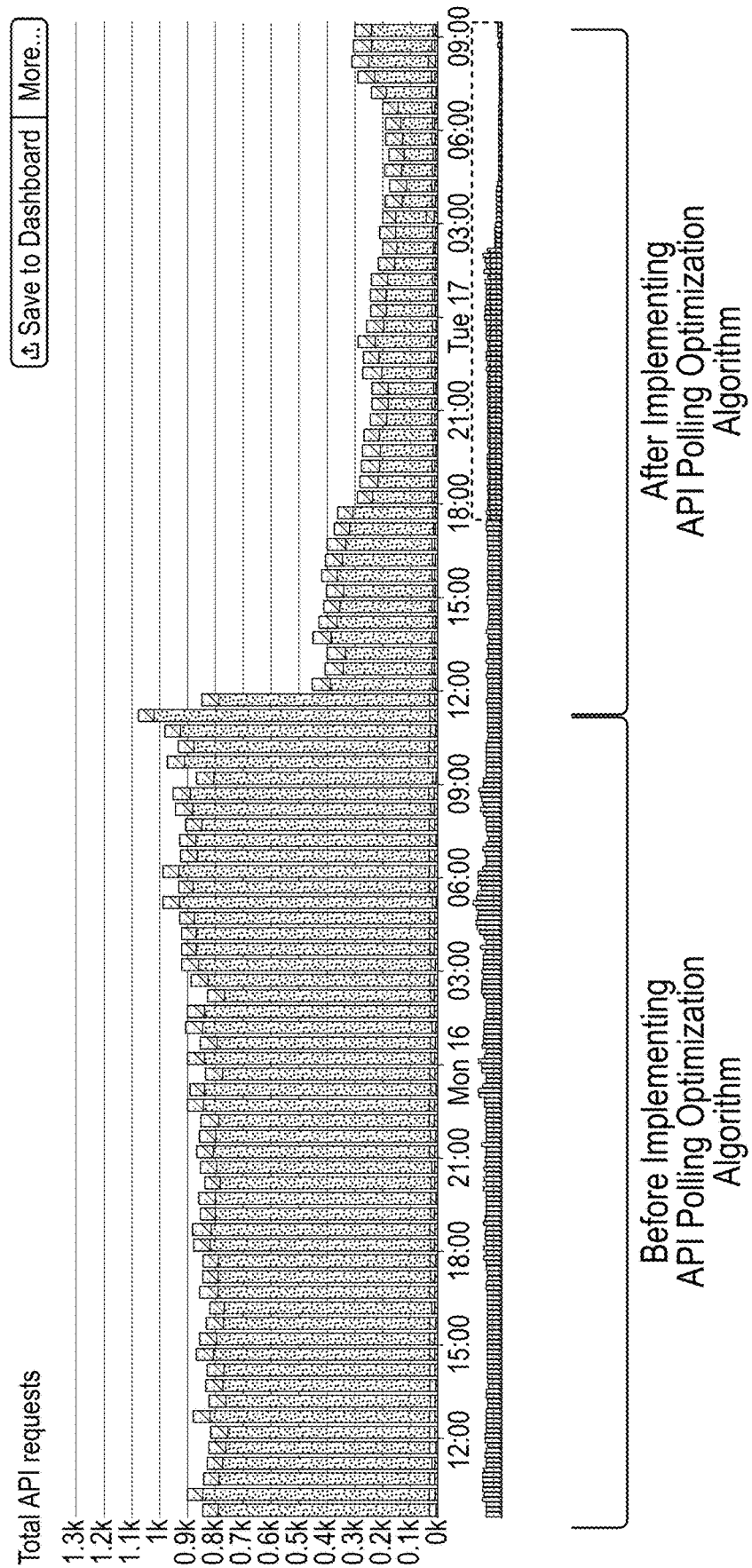
FIG. 8A, FIG. 8B, FIG. 9, and FIG. 10 illustrate example real-world results of using the API polling optimization algorithm in accordance with one or more embodiments of the present application.

At least one technical advantage of using the API polling optimization algorithm according to the one or more embodiments described herein, is illustrated in FIG. 8A. FIG. 8A illustrates real-world results of using the API polling optimization algorithm in accordance with the one or more embodiments described herein. In such an example, a subject poller associated with a subject subscriber and, more specifically, the historical polling steps of the subject poller associated with the subject subscriber were within the step processing time limit and memory limit constraints defined by the system or service implementing method 200. Accordingly, based on executing the API polling optimization algorithm, the API polling optimization algorithm outputted a new optimal polling step value that was larger than the previously implemented polling step value. Thus, the number of API requests transmitted to the security device (e.g., API endpoint of the security device) by the subject poller was reduced by approximately fifty percent as a result of using the new optimal polling step value.

Figure 8B:
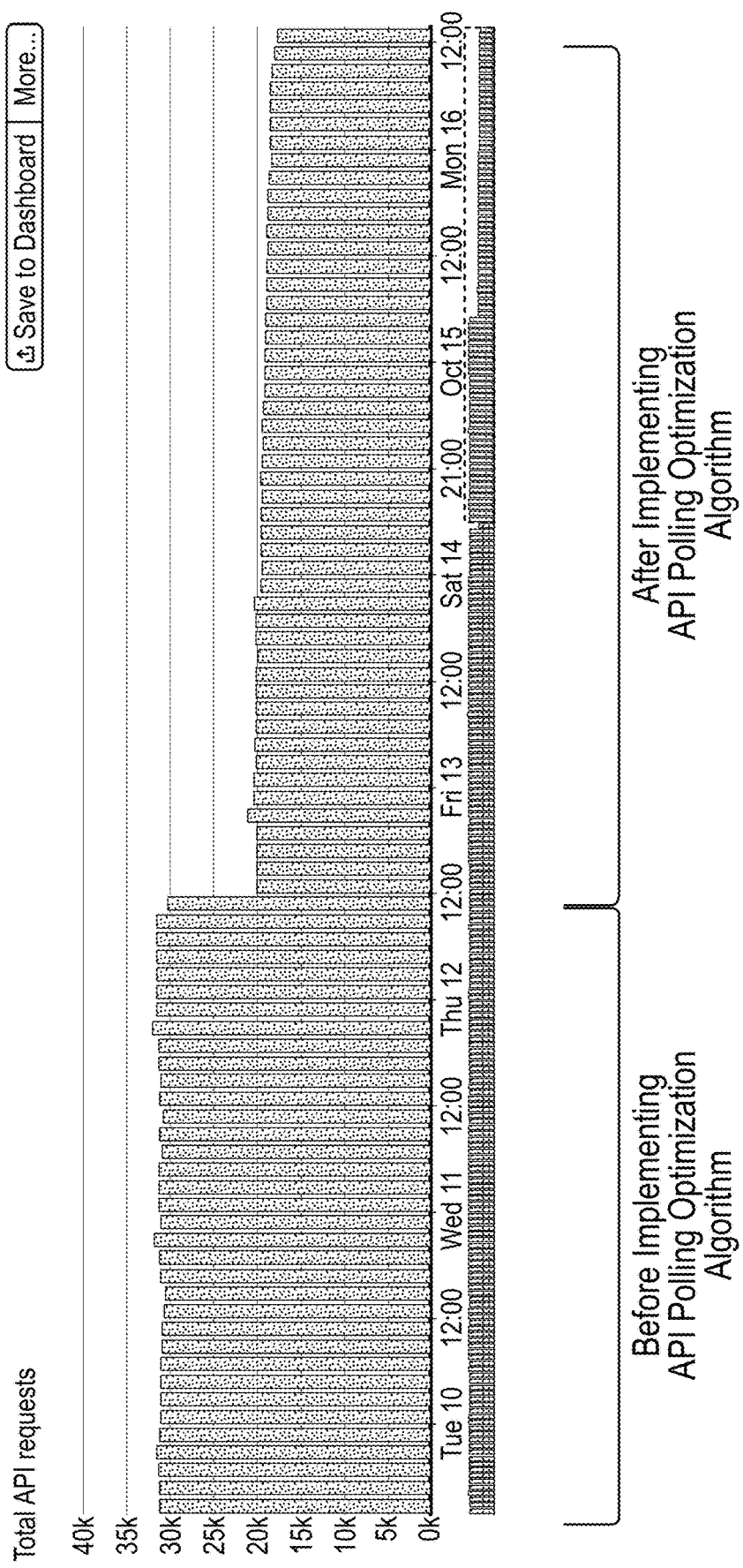

At least one technical advantage of using the API polling optimization algorithm according to the one or more embodiments described herein, is illustrated in FIG. 8B. FIG. 8B illustrates a real-world example of using the API polling optimization algorithm in accordance with the one or more embodiments described herein. In such an example, a subject poller associated with a subject subscriber and, more specifically, the historical polling steps of the subject poller associated with a subject subscriber were within step processing time limit and memory limit constraints defined by the system or service implementing method 200. Accordingly, based on executing the API polling optimization algorithm, the API polling optimization algorithm outputted a new optimal polling step value that was larger than the previously implemented polling step value. Thus, the number of API requests transmitted to the security device (e.g., API endpoint of the security device) by the subject poller was reduced by approximately thirty-three percent as a result of using the new optimal polling step value.

It shall be noted that decreasing the number of API requests that the system or service implementing method 200 makes to a given security device helps subscribers and the system or service to avoid hitting API rate limits especially with security devices where the subscriber and the system or service are both sharing from the same API quota.

Figure 9:
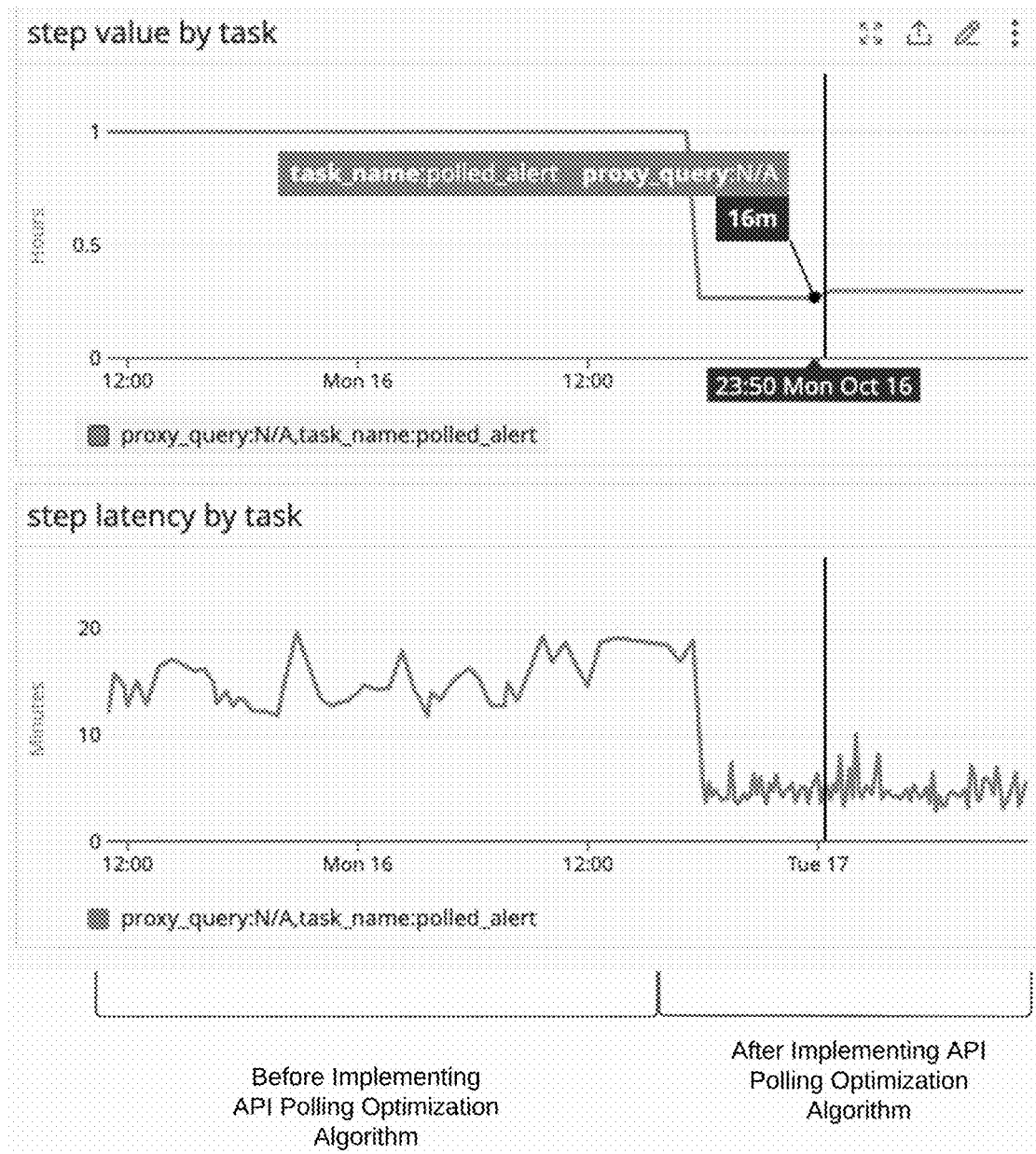

At least one technical advantage of using the API polling optimization algorithm according to the one or more embodiments described herein, is illustrated in FIG. 9. FIG. 9 illustrates a real-world example of using the API polling optimization algorithm in accordance with the one or more embodiments described herein. In such example, a target poller associated with a subject subscriber may have been using a system-default polling step value of one hour (e.g., each integration or security may have a distinct step value-a first security device (e.g., Netskope®) may have a system-default polling step value of 10 minutes, while a second security device (e.g., Microsoft Sentinel®) may have a system-default polling step value of 60 minute). Accordingly, in such an example, the API polling optimization algorithm outputs the optimal polling step value for the target poller to be 16 minutes. It shall be noted that prior to using the optimal polling step value of 16 minutes for the target poller, it was taking the target poller upwards of 20 minutes to complete a polling step, now polling steps are consistently completed within five (5) minutes. Thus, enabling a faster retrieval and uploading of new alert data into the cybersecurity event detection and response service.

Figure 10:
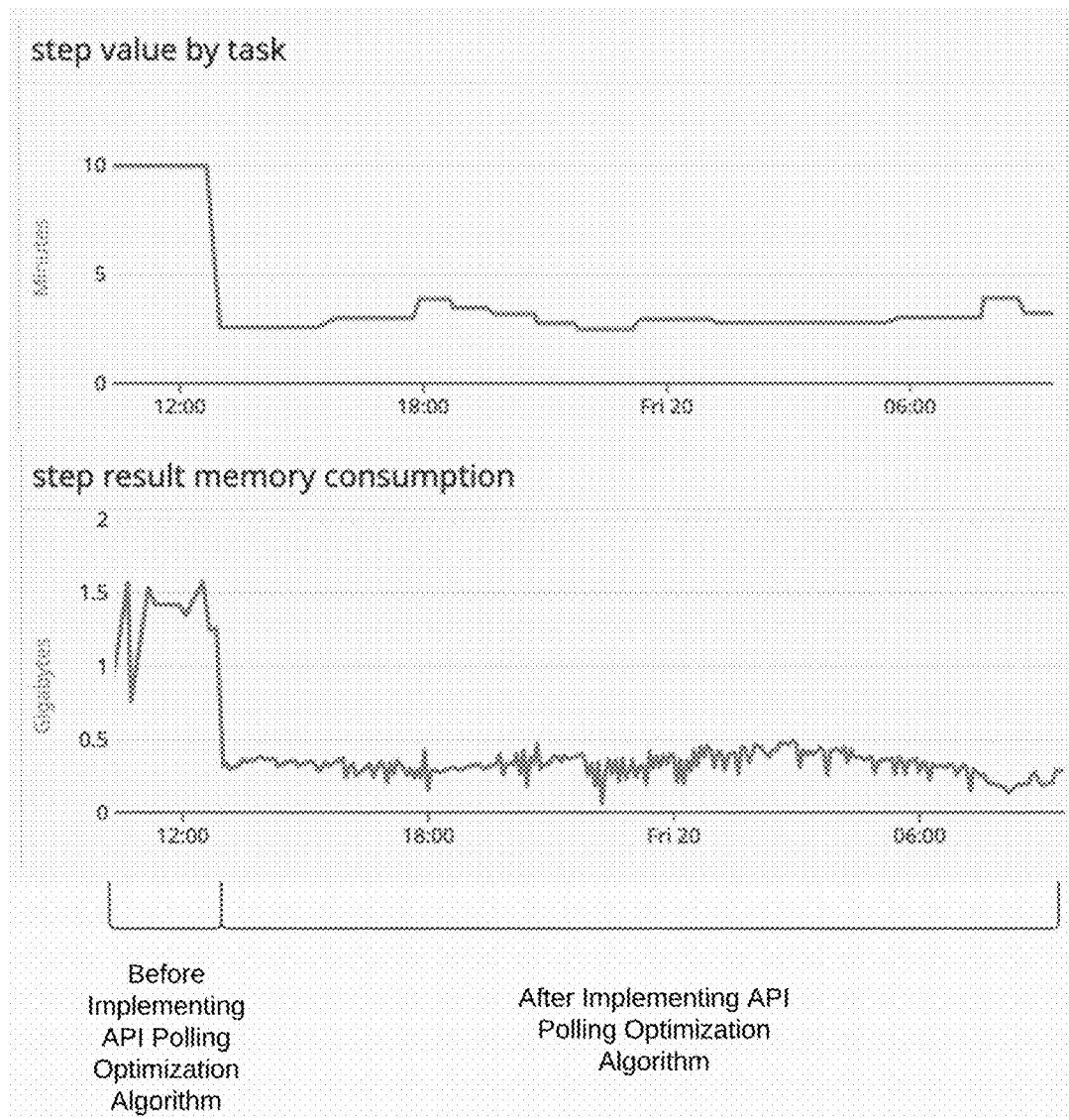

At least one technical advantage of using the API polling optimization algorithm according to the one or more embodiments described herein, is illustrated in FIG. 10. FIG. 10 illustrates real-world results of using the API polling optimization algorithm in accordance with the one or more embodiments described herein. In such an example, a target poller associated with a subject subscriber may have been using a system-default polling step value of ten (10) minutes and consuming upwards of 1.5 gigabytes of memory. Accordingly, in such an example, the API polling optimization algorithm outputs the optimal polling step value for the target poller to be 3 minutes. Thus, the memory usage of each polling step performed by the target poller is smaller and has less variable memory consumption per polling step.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:
    at a cybersecurity event detection and response service that is implemented by a network of distributed computers:
        generating, via one or more computers, a polling task that is configured to retrieve raw event data of a target subscriber that occurred during a target time span from a third-party security service;
        computing, via the one or more computers, a polling frequency control value for the polling task in real-time in response to generating the polling task, wherein computing the polling frequency control value for the polling task includes:
            automatically sourcing, from a computer database, polling performance data for a predetermined number of historical polling steps executed by the cybersecurity event detection and response service, wherein each historical polling step of the predetermined number of historical polling steps retrieved a distinct set of historical raw event data of the target subscriber from the third-party security service for a distinct time interval,
            automatically computing, using the polling performance data, a memory-informed candidate polling frequency control value based in part on memory used during the predetermined number of historical polling steps and a time-informed candidate polling frequency control value based in part on an amount of time used to complete the predetermined number of historical polling steps, and
            automatically electing one of the memory-informed candidate polling frequency control value and the time-informed candidate polling frequency control value as the polling frequency control value in response to assessing the memory-informed candidate polling frequency control value against the time-informed candidate polling frequency control value;
        partitioning, via the one or more computers, the target time span into a plurality of distinct sub-intervals of time based on the polling frequency control value computed for the polling task;
        automatically transmitting, to an application programming interface endpoint of the third-party security service, a plurality of distinct network requests to perform the polling task, wherein each distinct network request corresponds to (i) a distinct sub-interval of time of the plurality of distinct sub-intervals of time and (ii) is configured to retrieve a respective portion of the raw event data that corresponds to the distinct sub-interval of time of the plurality of distinct sub-intervals of time;
        receiving the raw event data of the target subscriber from the third-party security service that occurred during the target time span in response to transmitting the plurality of distinct network requests; and
        generating, in real-time, one or more security alerts based on the cybersecurity event detection and response service processing the raw event data received from the third-party security service.

2. The computer-implemented method according to claim 1, wherein the polling performance data for the predetermined number of historical polling steps includes:
    a first amount of memory that was used during a first historical polling step of the predetermined number of historical polling steps,
    a second amount of memory that was used during a second historical polling step of the predetermined number of historical polling steps,
    a third amount of memory that was used during a third historical polling step of the predetermined number of historical polling steps,
    a fourth amount of memory that was used during a fourth historical polling step of the predetermined number of historical polling steps, and
    a fifth amount of memory that was used during a fifth historical polling step of the predetermined number of historical polling steps.

3. The computer-implemented method according to claim 2, wherein the polling performance data for the predetermined number of historical polling steps further includes:
    a first polling step length value measured in time that corresponds to the first historical polling step,
    a second polling step length value measured in time that corresponds to the second historical polling step,
    a third polling step length value measured in time that corresponds to the third historical polling step,
    a fourth polling step length value measured in time that corresponds to the fourth historical polling step, and
    a fifth polling step length value measured in time that corresponds to the fifth historical polling step.

4. The computer-implemented method according to claim 3, further comprising:
- computing, via the one or more computers, a first average memory per second value that corresponds to the first historical polling step by dividing the first amount of memory that was used during the first historical polling step by the first polling step length value;
- computing, via the one or more computers, a second average memory per second value that corresponds to the second historical polling step by dividing the second amount of memory that was used during the second historical polling step by the second polling step length value;
- computing, via the one or more computers, a third average memory per second value that corresponds to the third historical polling step by dividing the third amount of memory that was used during the third historical polling step by the third polling step length value;
- computing, via the one or more computers, a fourth average memory per second value that corresponds to the fourth historical polling step by dividing the fourth amount of memory that was used during the fourth historical polling step by the fourth polling step length value; and
- computing, via the one or more computers, a fifth average memory per second value that corresponds to the fifth historical polling step by dividing the fifth amount of memory that was used during the fifth historical polling step by the fifth polling step length value.

5. The computer-implemented method according to claim 4, wherein automatically computing the memory-informed candidate polling frequency control value includes:
- determining, via the one or more computers, a maximum memory usage per step length second value based on determining a maximum of the first average memory per second value, the second average memory per second value, the third average memory per second value, the fourth average memory per second value, and the fifth average memory per second value, and
- computing the memory-informed candidate polling frequency control value by dividing a predetermined maximum memory limit defined via the cybersecurity event detection and response service by the maximum memory usage per step length second value.

6. The computer-implemented method according to claim 2, wherein the polling performance data for the predetermined number of historical polling steps further includes:
- a first polling step execution time value that corresponds to a total time duration required to complete the first historical polling step,
- a second polling step execution time value that corresponds to the total time duration required to complete the second historical polling step,
- a third polling step execution time value that corresponds to the total time duration required to complete the third historical polling step,
- a fourth polling step execution time value that corresponds to the total time duration required to complete the fourth historical polling step, and
- a fifth polling step execution time value that corresponds to the total time duration required to complete the fifth historical polling step.

7. The computer-implemented method according to claim 6, wherein the polling performance data for the predetermined number of historical polling steps further includes:
- a first polling step length value measured in time that corresponds to the first historical polling step,
- a second polling step length value measured in time that corresponds to the second historical polling step,
- a third polling step length value measured in time that corresponds to the third historical polling step,
- a fourth polling step length value measured in time that corresponds to the fourth historical polling step, and
- a fifth polling step length value measured in time that corresponds to the fifth historical polling step.

8. The computer-implemented method according to claim 7, further comprising:
- computing, via the one or more computers, a first execution time seconds per step length second value that corresponds to the first historical polling step by dividing the first polling step execution time value of the first historical polling step by the first polling step length value of the first historical polling step,
- computing, via the one or more computers, a second execution time seconds per step length second value that corresponds to the second historical polling step by dividing the second polling step execution time value of the second historical polling step by the second polling step length value of the second historical polling step,
- computing, via the one or more computers, a third execution time seconds per step length second value that corresponds to the third historical polling step by dividing the third polling step execution time value of the third historical polling step by the third polling step length value of the third historical polling step,
- computing, via the one or more computers, a fourth execution time seconds per step length second value that corresponds to the fourth historical polling step by dividing the fourth polling step execution time value of the fourth historical polling step by the fourth polling step length value of the fourth historical polling step, and
- computing, via the one or more computers, a fifth execution time seconds per step length second value that corresponds to the fifth historical polling step by dividing the fifth polling step execution time value of the fifth historical polling step by the fifth polling step length value of the fifth historical polling step.

9. The computer-implemented method according to claim 8, wherein automatically computing the time-informed candidate polling frequency control value includes:
- determining, via the one or more computers, a median execution time seconds per step length second value based on determining a median of the first execution time seconds per step length second value, the second execution time seconds per step length second value, the third execution time seconds per step length second value, the fourth execution time seconds per step length second value, and the fifth execution time seconds per step length second value, and
- computing the time-informed candidate polling frequency control value by dividing a predetermined maximum polling step processing time limit defined via the cybersecurity event detection and response service by the median execution time seconds per step length second value.

10. The computer-implemented method according to claim 1, wherein:
- partitioning the target time span into the plurality of distinct sub-intervals of time includes:

partitioning the target time span into a first sub-interval of time that corresponds to a first distinct portion of the target time span, partitioning the target time span into a second sub-interval of time that corresponds to a second distinct portion of the target time span, wherein the second sub-interval of time does not overlap with the first sub-interval of time, and partitioning the target time span into a third sub-interval of time that corresponds to a third distinct portion of the target time span, wherein the third sub-interval of time does not overlap with the first sub-interval of time nor the second sub-interval of time.

11. The computer-implemented method according to claim 10, further comprising:

automatically creating, via the one or more computers, a first distinct network request that is configured to retrieve the respective portion of the raw event data of the target subscriber that corresponds to the first distinct portion of the target time span;

automatically creating, via the one or more computers, a second distinct network request that is configured to retrieve the respective portion of the raw event data of the target subscriber that corresponds to the second distinct portion of the target time span; and automatically creating, via the one or more computers, a third distinct network request that is configured to retrieve the respective portion of the raw event data of the target subscriber that corresponds to the third distinct portion of the target time span.

12. The computer-implemented method according to claim 11, wherein automatically transmitting the plurality of distinct network requests to the application programming interface endpoint of the third-party security service includes:

electronically transmitting, over a computer network, the first distinct network request to the application programming interface endpoint of the third-party security service to retrieve the respective portion of the raw event data of the target subscriber that corresponds to the first distinct portion of the target time span, electronically transmitting, over the computer network, the second distinct network request to the application programming interface endpoint of the third-party security service to retrieve the respective portion of the raw event data of the target subscriber that corresponds to the second distinct portion of the target time span, and electronically transmitting, over the computer network, the third distinct network request to the application programming interface endpoint of the third-party security service to retrieve the respective portion of the raw event data of the target subscriber that corresponds to the third distinct portion of the target time span.

13. The computer-implemented method according to claim 12, wherein receiving the raw event data of the target subscriber from the third-party security service that occurred during the target time span includes:

receiving, from the third-party security service, the respective portion of the raw event data of the target subscriber that corresponds to the first distinct portion of the target time span in response to transmitting the first distinct network request to the application programming interface endpoint of the third-party security service, receiving, from the third-party security service, the respective portion of the raw event data of the target subscriber that corresponds to the second distinct portion of the target time span in response to transmitting the second distinct network request to the application programming interface endpoint of the third-party security service, and receiving, from the third-party security service, the respective portion of the raw event data of the target subscriber that corresponds to the third distinct portion of the target time span in response to transmitting the third distinct network request to the application programming interface endpoint of the third-party security service.

14. The computer-implemented method according to claim 1, wherein:

the one of the memory-informed candidate polling frequency control value and the time-informed candidate polling frequency control value is greater than a static, predefined polling frequency control value defined for the third-party security service, thereby (i) reducing a total number of network requests that the cybersecurity event detection and response service transmits to the application programming interface endpoint to obtain the raw event data and (ii) reducing a likelihood of the polling task encountering an application programming interface request error due to exceeding a predetermined maximum application programming interface rate limit defined by the third-party security service.

15. The computer-implemented method according to claim 1, wherein:

the one of the memory-informed candidate polling frequency control value and the time-informed candidate polling frequency control value is smaller than a static, predefined polling frequency control value defined for the third-party security service, thereby (i) accelerating the receiving of the raw event data by the cybersecurity event detection and response service, (ii) the generation of the one or more security alerts, and (iii) a detection of a security threat associated with one or more security alerts.

16. The computer-implemented method according to claim 1, further comprising:

executing, in real-time, a threat mitigation response that mitigates a security threat corresponding to the one or more security alerts by:

(i) surfacing the security threat and the one or more security alerts in real-time to a threat reporting user interface accessible to the target subscriber, (ii) generating one or more proposed threat remediation actions for the one or more security alerts in real-time that, when implemented, mitigates the security threat corresponding to the one or more security alerts, and (iii) surfacing the one or more proposed threat remediation actions in real-time to the threat reporting user interface accessible to the target subscriber.

17. The computer-implemented method according to claim 1, wherein:

the one or more security alerts includes a compromised digital asset of the target subscriber, the computer-implemented method further comprising executing, in real-time, a threat mitigation response that mitigates a security threat corresponding to the compromised digital asset by:

automatically executing, in real-time, one or more automated threat remediation actions that adapts a configuration characteristic or operating characteristic of one or more digital environments of the target subscriber to resolve the security threat associated with the compromised digital asset.

18. A method comprising:

at a cybersecurity event detection and response service:
- generating, via one or more computers, a polling task that is configured to retrieve raw event data of a target subscriber that occurred during a target time span from a third-party security service;
- computing, via the one or more computers, a polling frequency control value for the polling task in real-time in response to generating the polling task, wherein computing the polling frequency control value for the polling task includes:
  - automatically sourcing, from a computer database, polling performance data for a predetermined number of historical polling steps executed by the cybersecurity event detection and response service, wherein each historical polling step of the predetermined number of historical polling steps retrieved a distinct set of historical raw event data of the target subscriber from the third-party security service for a distinct time interval,
  - automatically computing, using the polling performance data, a memory-informed candidate polling frequency control value based in part on memory used during the predetermined number of historical polling steps and a time-informed candidate polling frequency control value based in part on an amount of time used to complete the predetermined number of historical polling steps, and
  - automatically electing one of the memory-informed candidate polling frequency control value and the time-informed candidate polling frequency control value as the polling frequency control value in response to assessing the memory-informed candidate polling frequency control value against the time-informed candidate polling frequency control value;
- partitioning, via the one or more computers, the target time span into a plurality of distinct sub-intervals of time based on the polling frequency control value computed for the polling task;
- automatically transmitting, to an application programming interface endpoint of the third-party security service, a plurality of distinct network requests to perform the polling task, wherein each distinct network request corresponds to (i) a distinct sub-interval of time of the plurality of distinct sub-intervals of time and (ii) is configured to retrieve a respective portion of the raw event data that corresponds to the distinct sub-interval of time of the plurality of distinct sub-intervals of time;
- receiving the raw event data of the target subscriber from the third-party security service that occurred during the target time span in response to transmitting the plurality of distinct network requests; and
- generating, in real-time, one or more security alerts based on the cybersecurity event detection and response service processing the raw event data received from the third-party security service.

* * * * *